United States Patent
Wipff, III et al.

(10) Patent No.: US 12,172,938 B1
(45) Date of Patent: *Dec. 24, 2024

(54) COMPOSITE COATING FOR SEED HAVING PLURALITY OF COATING LAYERS EXTENDING AROUND THE SEED

(71) Applicant: Central Garden & Pet Company, Walnut Creek, CA (US)

(72) Inventors: Joseph Karl Wipff, III, Albany, OR (US); Kenneth W. Hignight, Albany, OR (US); Debra L. Hignight, Albany, OR (US)

(73) Assignee: Central Garden & Pet Company, Walnut Creek, CA (US)

( * ) Notice: Subject to any disclaimer, the term of this patent is extended or adjusted under 35 U.S.C. 154(b) by 121 days.

This patent is subject to a terminal disclaimer.

(21) Appl. No.: 17/879,020

(22) Filed: Aug. 2, 2022

Related U.S. Application Data

(63) Continuation of application No. 16/778,297, filed on Jan. 31, 2020, now Pat. No. 11,447,431, which is a continuation-in-part of application No. 15/927,523, filed on Mar. 21, 2018, now Pat. No. 11,324,160.

(60) Provisional application No. 62/519,517, filed on Jun. 14, 2017.

(51) Int. Cl.
| | |
|---|---|
| *C05G 5/30* | (2020.01) |
| *C05C 5/04* | (2006.01) |
| *C05C 9/00* | (2006.01) |

(52) U.S. Cl.
CPC .................. *C05G 5/37* (2020.02); *C05C 5/04* (2013.01); *C05C 9/00* (2013.01)

(58) Field of Classification Search
CPC .................................. A01C 1/06; C09D 1/10
See application file for complete search history.

(56) References Cited

U.S. PATENT DOCUMENTS

| | | |
|---|---|---|
| 4,297,810 A | 11/1981 | Hansford |
| 4,369,597 A | 1/1983 | Leep et al. |
| 4,779,376 A | 10/1988 | Redenbaugh |
| 5,456,733 A | 10/1995 | Hamilton, Jr. |
| 5,653,053 A | 8/1997 | Handley |
| 5,746,022 A | 5/1998 | Brown et al. |
| 5,799,439 A | 9/1998 | MacGregor |
| 6,156,699 A | 12/2000 | Johnson et al. |
| 6,158,167 A | 12/2000 | Spittle |
| 6,230,438 B1 | 5/2001 | Zaychuk et al. |
| 6,209,259 B1 | 8/2001 | Madigan et al. |
| 6,329,324 B1 | 12/2001 | Brueggemann et al. |
| 6,360,478 B1 | 3/2002 | Spittle |
| 6,557,298 B2 | 5/2003 | Obert et al. |
| 6,688,038 B1 | 2/2004 | Paternoster et al. |
| 6,936,573 B2 | 8/2005 | Wertz et al. |
| 6,936,681 B1 | 8/2005 | Wertz et al. |
| 7,213,367 B2 | 5/2007 | Wertz et al. |

(Continued)

OTHER PUBLICATIONS

Final Office Action in commonly owned U.S. Appl. No. 15/927,523 mailed Jan. 15, 2021, pp. 1-23.

(Continued)

*Primary Examiner* — Joshua J Michener
*Assistant Examiner* — Arfan Y. Sinaki
(74) *Attorney, Agent, or Firm* — Additon, Pendleton & Witherspoon, P.A.

(57) ABSTRACT

In an agricultural product, a seed is contained within a composite coating. The composite coating has successive layers, and one or more of the layers can include fertilizer, a binder, and/or lime.

45 Claims, 3 Drawing Sheets

(56) References Cited

U.S. PATENT DOCUMENTS

| | | |
|---|---|---|
| 7,367,158 B2 | 5/2008 | Hakala et al. |
| 8,256,158 B2 | 9/2012 | Spittle et al. |
| 8,904,704 B1 | 12/2014 | Madigan et al. |
| 9,353,019 B2 | 5/2016 | Faust |
| 11,324,160 B1 | 5/2022 | Wipff, III et al. |
| 2002/0121117 A1 | 9/2002 | Hartmann et al. |
| 2003/0182854 A1 | 10/2003 | Reinikaninen |
| 2003/0228981 A1 | 12/2003 | Wertz et al. |
| 2004/0016275 A1 | 1/2004 | Hartmann et al. |
| 2004/0020114 A1 | 2/2004 | Boehmer et al. |
| 2006/0150489 A1 | 7/2006 | Legro et al. |
| 2006/0240983 A1 | 10/2006 | Yamaguchi |
| 2010/0267554 A1 | 10/2010 | Madsen et al. |
| 2011/0250018 A1 | 10/2011 | Cannock |
| 2012/0220454 A1 | 8/2012 | Chen et al. |
| 2013/0196849 A1 | 8/2013 | Combs et al. |
| 2013/0305796 A1 | 11/2013 | Hudson et al. |
| 2013/0309499 A1 | 11/2013 | Neff et al. |
| 2014/0318005 A1 | 10/2014 | Krysiak et al. |
| 2015/0239790 A1 | 8/2015 | Iwig et al. |
| 2015/0267063 A1 | 9/2015 | Drewer et al. |
| 2017/0042082 A1 | 2/2017 | McMillan et al. |
| 2017/0086488 A1 | 3/2017 | McMillan et al. |
| 2017/0121233 A1 | 5/2017 | Meakin |
| 2017/0204018 A1 | 7/2017 | Hignight et al. |
| 2017/0245494 A1 | 8/2017 | Bardosh et al. |
| 2018/0251654 A1 | 9/2018 | Chen et al. |
| 2019/0320661 A1 | 10/2019 | Arias et al. |

OTHER PUBLICATIONS

Office Action in commonly owned U.S. Appl. No. 15/927,523 mailed Jul. 8, 2020, pp. 1-23.

Office Action in commonly owned U.S. Appl. No. 15/927,523 mailed Aug. 9, 2021, pp. 1-21.

Office Action in commonly owned U.S. Appl. No. 16/778,297 mailed Sep. 29, 2020, pp. 1-20.

Final Office Action in commonly owned U.S. Appl. No. 16/778,297 mailed Jul. 6, 2021, pp. 1-22.

Office Action in commonly owned U.S. Appl. No. 16/778,297 mailed Nov. 18, 2021, pp. 1-24.

COMPOSITE COATING FOR SEED HAVING PLURALITY OF COATING LAYERS EXTENDING AROUND THE SEED

CROSS-REFERENCE TO PRIORITY APPLICATIONS

This application is a continuation of U.S. patent application Ser. No. 16/778,297 for Composite Coating for Seed filed Jan. 31, 2020, which is a continuation-in-part of U.S. patent application Ser. No. 15/927,523 for Composite Coating for Seed filed Mar. 21, 2018, each of which is hereby incorporated by reference in its entirety.

This application further claims the benefit of U.S. Provisional Patent Application Ser. No. 62/519,517 for Coating for Seeds filed Jun. 14, 2017, which is hereby incorporated by reference in its entirety.

BACKGROUND

This disclosure relates to coatings for seeds and, more particularly, to coatings for grass seed.

The general concept of coating seed with chemical additives is known. For example, coating grass seed with a polymer film coating is known, wherein the polymer film coating may function as an adhesion promoting agent or binder (e.g., "polymeric sticker").

To facilitate ease of understanding of the embodiments disclosed below, it is noted that those of ordinary skill in the art understand that "N-P-K" is elemental shorthand for the three major (Primary) nutrients in fertilizers, wherein "N" stands for weight percentage of nitrogen, "P" stands for weight percentage of phosphorus, for example in the form of phosphorus pentoxide (e.g., $P_2O_2$) or the like, and "K" stands for weight percentage of potassium, for example in the form of potash (e.g., $K_2O$) or the like.

SUMMARY

Aspects of this disclosure include the provision of composite seed coatings, coated seed products, and associated methods and systems.

Another aspect of this disclosure is the provision of an agricultural product comprising a composite coating at least partially enclosing a seed, for example a grass seed. The composite coating can include a plurality of layers, and the plurality of layers can include an inner layer at least partially enclosing the grass seed, an intermediate layer at least partially enclosing the inner layer, and an outer layer at least partially enclosing the intermediate layer. One or more of the layers can include fertilizer, a binder, non-nutritive material (e.g. lime and/or talc) and/or nutritive material (e.g. gypsum, $CaSO_4 \cdot 2H_2O$). As used herein, the term nutritive material refers to a material capable of delivering either Secondary nutrients (e.g. Ca, Mg, and/or S) and/or Micronutrients (e.g. Fe, Mn, Zn, Cu, Mo, B, and/or Cl). In one example, each of the inner, intermediate, and outer layers comprises fertilizer. In another example, the inner layer comprises fertilizer, and the outer layer comprises the non-nutritive and/or nutritive material. In another example, the plurality of layers includes at least five layers and up to thirteen layers, or more. Each of the layers can comprise fertilizer, a binder, non-nutritive material and/or nutritive material.

As another example, in a composite coating having at least four or five successive layers respectively extending at least partially around one another, one or more of the layers can include fertilizer, a binder, non-nutritive material and/or nutritive material. For example, at least two of the layers can be spaced apart from one another and comprise fertilizer, and at least two other of the layers can be spaced apart from one another and comprise non-nutritive material and/or nutritive material. For example, the outermost or exterior layer of the plurality of layers can comprise the non-nutritive material and/or nutritive material. One or more additional successive layers can be included.

In one example, layers of the composite coating successively alternate at least between layers comprising fertilizer and layers comprising non-nutritive material and/or nutritive material, wherein there can be numerous of the layers, and one or more of the layers can comprise additional or other materials. For example, there can be layers of binder material and/or the binder material can be included in the fertilizer layers.

The foregoing summary provides a few brief examples and is not exhaustive, and the present invention is not limited to the foregoing examples. The foregoing examples, as well as other examples, are further explained in the following detailed description with reference to accompanying drawings.

BRIEF DESCRIPTION OF THE DRAWINGS

The drawings discussed below are schematic and not drawn to scale. The drawings are provided as examples. The present invention may be embodied in many different forms and should not be construed as limited to the examples depicted in the drawings and/or described below.

DETAILED DESCRIPTION

An aspect of this disclosure is the provision of seeds (e.g., grass seeds) with improved composite coatings. As examples, improved composite coatings can include a predetermined amount of chemical additive (e.g., fertilizer in the form of ammonium sulfate, calcium nitrate, potassium nitrate, and/or urea); the improved composite coatings can be applied as a liquid and/or a powder; the improved composite coatings can include or not include non-nutritive material such as, but not limited to, talc and/or calcium carbonate (e.g., lime); and/or nutritive material (e.g. gypsum, $CaSO_4 \cdot 2H_2O$) capable of delivering either Secondary nutrients (e.g. Ca, Mg, and/or S) and/or Micronutrients (e.g. Fe, Mn, Zn, Cu, Mo, B, and/or Cl; and/or the improved composite coatings can include or not include a binding agent.

As an example, the binding agent can be a constituent of commercially available polymeric seed coating materials (e.g., polymeric stickers). A suitable polymeric sticker may be UNICOAT™ seed coating polymers available from Universal Coating Systems of Independence Oregon, and/or Milliken® Pennington Green 61 seed coating polymers available from Milliken and Company, Spartanburg, SC, and/or the binder or sticker can be any other suitable material. For example, when the composite coating includes lime, the lime may function as a binding agent, and in some situations the polymeric sticker or binder may be omitted. As discussed in greater detail below, the lime may function as a binder when associated with a wet coating, and the binding by the lime may be enhanced by dissolving urea fertilizer in water of the wet coating.

For example, grass seed coated with the improved composite coatings can be spread to provide spread rates ranging from (e.g., from about) 0.0625 lbs. of nitrogen per 1000 ft$^2$ or acre (e.g., 43,560 square feet) to (e.g., to about) 0.5 lbs. of nitrogen per 1000 ft$^2$ or acre, and the composite coatings can be configured to provide increased growth from (e.g., from about) 10% to (e.g., to about) 110% improved green cover in three weeks, including all values and subranges therebetween for each of the above ranges. In accordance with first through eleventh embodiments of this disclosure, each composite coating can include at least four layers, for example at least five layers, or a range of from four to fifteen layers, including all values and subranges therebetween. For example, the composite coating can have a plurality of layers comprising at least four layers, at least five layers, at least six layers, at least seven layers, at least eight layers, or more or less layers. The above examples may be referred to as a first embodiment of this disclosure. Alternatively, there may be less than five layers or more than fifteen layers.

Figure 1:
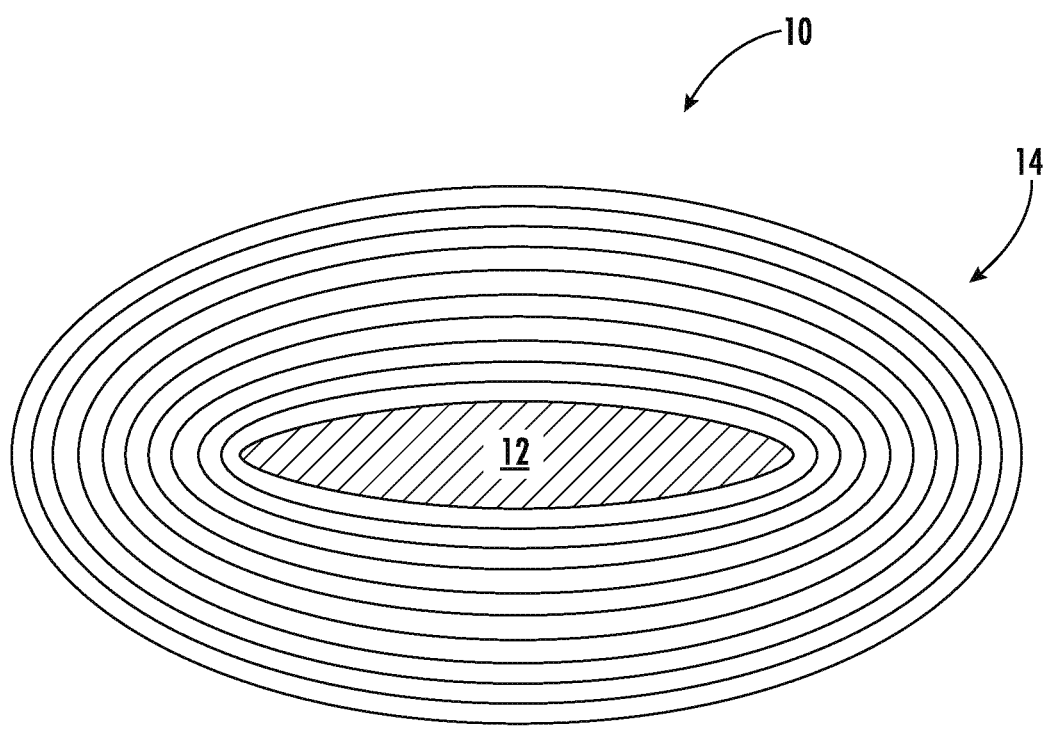
FIG. 1 is a schematic, enlarged, cross-sectional view of a coated seed, in accordance with an embodiment of this disclosure.
Figure 2:
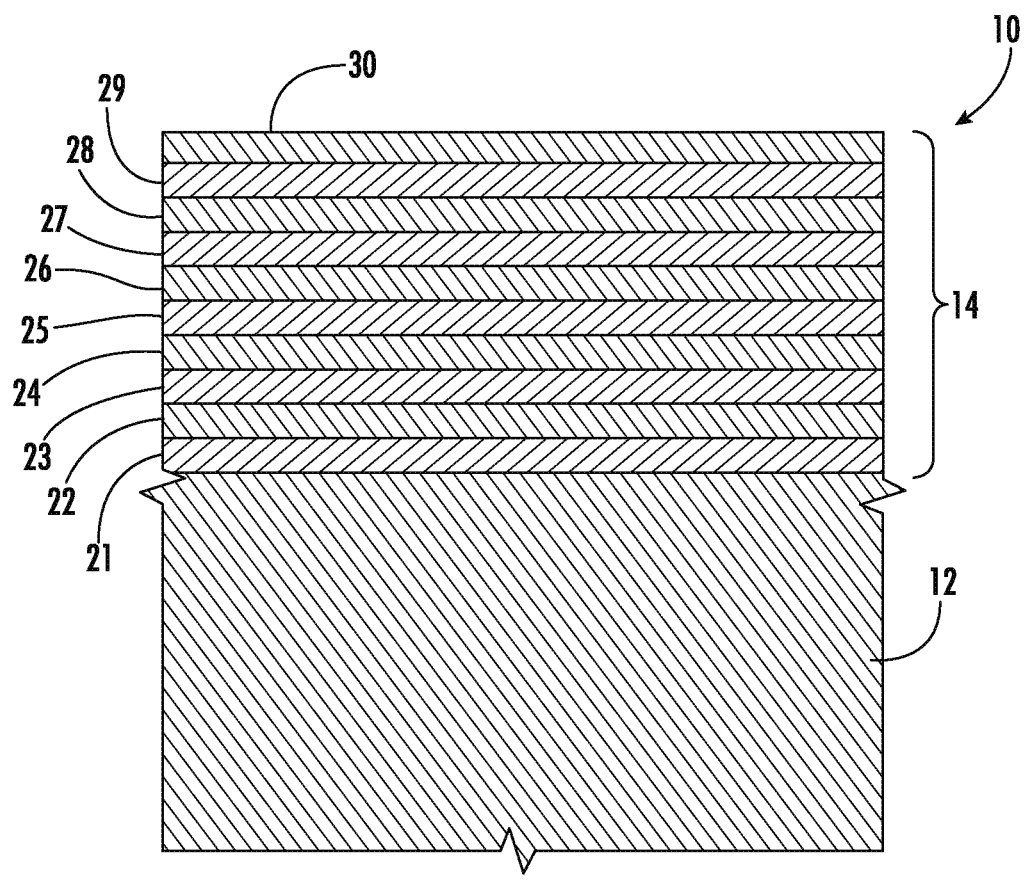
FIG. 2 schematically depicts an enlarged portion of the coated seed of FIG. 1.

As an example of a coated seed 10 in accordance with the first embodiment, FIGS. 1 and 2 schematically depict a seed 12, which may be a grass seed, encapsulated within a composite coating 14. FIG. 2 schematically depicts an enlarged portion of the coated seed 10 of FIG. 1. FIGS. 1 and 2 are not drawn to scale.

In FIGS. 1 and 2, the composite coating 14 is depicted as having ten coating layers 21, 22, 23, 24, 25, 26, 27, 28, 29, 30; although it is within the scope of this disclosure for there to be a greater or lesser number of the coating layers. FIGS. 1 and 2 at least partially depict that the coating layers 21-30 may be distinct from one another as a result of being separated by clearly demarked boundaries. Notwithstanding, it is believed that the boundaries between immediately adjacent layers of the coating layers 21-30 may be less distinct than schematically depicted in FIGS. 1 and 2.

Referring to FIG. 2, the first coating layer 21 can be an inner coating layer, a base coating layer, or an innermost coating layer. Each of the second through ninth coating layers 22-29 can be an intermediate coating layer, an inner coating layer, or an outer coating layer. The tenth coating layer 30 can be an outer coating layer or an outermost (e.g., exterior) coating layer. One or more of the coating layers 21-30 may be omitted, and there can be one or more additional coating layers.

As shown in FIG. 2, the exterior surface of the seed 12 is in opposing face-to-face contact with the innermost coating layer 21, and each successive coating layer 21-30 is in opposing face-to-face contact with the respective adjacent coating layer(s). A physical bond can be present between at least some of, a majority of, or each of the surfaces or faces of the face-to-face contacts identified in the immediately prior sentence. On the other hand, there may be some structural irregularities with respect to one or more of the layers 21-30, as may be typically dependent upon the content of the layers and/or the processes by which the composite coatings 14 are formed. For example, suitable tolerances may be established that allow for reasonable variations in the physical characteristics and chemical properties between coated seeds 10 within and/or between batches. Accordingly, whereas a seed 12 may be fully encapsulated by each of the layers 21-30 of its composite coating 14, it may also be the case that one or more of the layers may not form a fully enclosing or fully encapsulating structure. Therefore, the layers 21-30 and composite coating 14 may be more generally referred to as at least partially encapsulating, at least partially enclosing, substantially encapsulating, and/or substantially enclosing the respective seed 12.

As further examples, other embodiments of composite coatings 14, coated seeds 10, and associated methods are disclosed in the following. The various embodiments of this disclosure can be alike, except for variations noted and variations that will be apparent to those of ordinary skill in the art. The present invention may, however, be embodied in many different forms and should not be construed as limited to the embodiments set forth herein. For example, features disclosed as part of one embodiment can be used in the context of another embodiment to yield a further embodiment. In the following, some of the embodiments may be named sequentially, but the sequence does not relate to relative preference. In the following examples, small-batch recipes are provided for producing relatively small batches of coated seeds 10. When producing the coated seeds 10 on a commercial scale, the commercial recipes can be calculated by multiplying accordingly (e.g., by orders of magnitude), as will be understood by those of ordinary skill in the art.

In accordance with a second embodiment, a method of coating grass seed 12 comprises, consists of, or consists essentially of:

Step 1 of Example 1 (e.g., at least partially forming coating layer 21): coat 453.6 grams of grass seed 12 (e.g., tall fescue seed) with 41.12 grams of 46-00-00 fertilizer composition. For facilitating this initial coating step, the fertilizer composition can be dissolved in a solvent to form a wet coating composition, wherein the wet coating composition is coated onto the grass seed 12. For example, the fertilizer composition can be dissolved into water, or the fertilizer can be dissolved into a polymeric binder or sticker solution (e.g., a mixture of 60 milliliters of water and 80 milliliters of concentrated UNICOAT™ polymer sticker solution).

Step 2 of Example 1 (e.g., at least partially forming coating layer 22): coat the precursory coated seed from Step 1 of Example 1 with 30 milliliters of the binder or sticker.

Step 3 of Example 1 (e.g., at least partially forming coating layer 23): coat the precursory coated seed from Step 2 of Example 1 with 106.47 grams of lime powder.

Step 4 of Example 1 (e.g., at least partially forming coating layer 24): coat the precursory coated seed from Step 3 of Example 1 with 30 milliliters of the binder or sticker.

Step 5 of Example 1 (e.g., at least partially forming coating layer 25): coat the precursory coated seed from Step 4 of Example 1 with 106.47 grams of lime powder.

Step 6 of Example 1 (e.g., at least partially forming coating layer 26): coat the precursory coated seed from Step 5 of Example 1 with 30 milliliters of the binder or sticker.

Step 7 of Example 1 (e.g., at least partially forming coating layer 27): coat the precursory coated seed from Step 6 of Example 1 with 106.47 grams of lime powder.

Step 8 of Example 1 (e.g., at least partially forming coating layer 28): coat the precursory coated seed from Step 7 of Example 1 with 30 milliliters of the binder or sticker.

Step 9 of Example 1 (e.g., at least partially forming coating layer 29): coat the precursory coated seed from Step 8 of Example 1 with 106.47 grams of lime powder.

Step 10 of Example 1 (e.g., at least partially forming coating layer 30): coat the precursory coated seed from Step 9 of Example 1 with 30 milliliters of the binder or sticker.

For example, the coated grass seeds 10 of the second embodiment can be spread to provide a spread rate of (e.g., of about) 0.25 lbs. of nitrogen per 1000 square feet, and a raw seed spread rate of (e.g., of about) 6 pounds of seed per 1000 square feet.

At least partially reiterating from above, aspects of the second embodiment are expressed in tabular form in Table 1 below, which includes reference numerals from FIG. 2.

TABLE 1

| 2nd Embodiment | |
| --- | --- |
| Components | Amounts |
| Grass seeds 12 (e.g., tall fescue) | 453.6 grams |
| innermost layer 21: 46-00-00 fertilizer composition (e.g., urea or UFLEXX ®) | 41.12 grams |
| layer 22: lime powder | 106.47 grams |
| layer 23: binder or sticker solution | 30 milliliters |
| layer 24: lime powder | 106.47 grams |
| layer 25: binder or sticker solution | 30 milliliters |
| layer 26: lime powder | 106.47 grams |
| layer 27: binder or sticker solution | 30 milliliters |
| layer 28: lime powder | 106.47 grams |
| layer 29: binder or sticker solution | 30 milliliters |
| outermost or exterior layer 30: lime powder | 106.47 grams |

At least partially reiterating from above, features (e.g., component totals) of the second embodiment can comprise, consist essentially of, or consist of:
- a raw seed spread rate of 6 pounds of seed 12 per 1000 square feet;
- 46-00-00 fertilizer composition (e.g., urea or UFLEXX®);
- a fertilizer spread rate of 0.25 pounds of nitrogen per 1000 square feet.
- 453.6 grams of grass seed 12 (e.g., tall fescue);
- 41.12 grams of the fertilizer composition;
- 412.88 grams of lime; and
- a total composite coating weight of 454 grams.

The above bullet points regarding the second embodiment are restated in the second to the last row of Table 2 below, and variations of the second embodiment are presented in the other rows of Table 2 below. For each of the examples in Table 2, there can be 453.6 grams of grass seed 12 (e.g., tall fescue), the uncoated seeding rate can be 6 lbs./1000 ft², and the total composite coating weight can be 454 grams.

TABLE 2

| Fertilizer | Desired N Rate lbs./1000 ft² | Fertilizer amount (grams) | Lime amount (grams) |
| --- | --- | --- | --- |
| Ammonium Sulfate (e.g. 21-0-0) | 0.25 | 89.23 | 364.77 |
| | 0.5 | 178.46 | 275.54 |
| 12-0-3 (e.g. urea or UFLEXX ®) | 0.25 | 157.64 | 296.36 |
| | 0.5 | 315.28 | 138.72 |
| 46-0-0 (e.g. urea or UFLEXX ®) | 0.25 | 41.12 | 412.88 |
| | 0.5 | 82.25 | 371.75 |

At least partially reiterating from above, the binder or sticker of the second embodiment can be, or more generally can comprise, a polymeric binder or sticker solution, for example UNICOAT™ colored seed coating polymers, or the sticker can be any other suitable binder or sticker. It is believed that the UNICOAT™ polymer sticker solution can be obtained in a concentrated form consisting of 36-38% water and 62-64% natural and proprietary polymers and colorants, and that prior to being used to coat the seed the UNICOAT™ polymer sticker solution may be diluted with water. For example, it is believed that one part of concentrated UNICOAT™ polymer sticker solution can be mixed with three parts water to create the binder or sticker solution that is coated on the seed 12. The composite coatings 14 can be applied to the seed 12 in any suitable manner, for example using conventional coaters (e.g., rotary coaters), conventional dryers and/or other suitable equipment, as discussed in greater detail below.

It is believed that, as part of the coating process, typically at least a majority of or substantially all of the water of the binder or sticker solution and/or any other wet coating composition evaporates, and the remaining contents of the binder or sticker solution and/or any other wet coating composition forms the resulting coating layer. In the second embodiment, the remaining contents of the binder or sticker solution that form each sticker coating layer form a relatively small weight percentage of the composite coating. Accordingly, in the examples of relative weight percentage provided in this disclosure, the weight of the above-referenced 62-64% natural and proprietary polymers of the binder or sticker solution are disregarded and, thus, the weight percentage values are typically approximated values. The weight percentage values are also described herein as being approximate because, for example, those of ordinary skill in the art will understand that some variations are typical in agricultural coating processes. More generally, all numerical values and percentages provided throughout this disclosure can be approximate.

In the second embodiment, the approximate weight percentage of each of the layers (e.g., disregarding the binder or sticker coating layers) can be calculated, and it is believed that each weight percentage can vary by plus or minus about 25%, plus or minus about 20%, plus or minus about 15%, plus or minus about 10%, or plus or minus about 5%, including all values and subranges therebetween for each of the above ranges. Similarly for the second embodiment, the overall approximate weight percentages of the components of the coated seeds 10 can be calculated, and it is believed that each weight percentage can vary by plus or minus about 25%, plus or minus about 20%, plus or minus about 15%, plus or minus about 10%, or plus or minus about 5%, including all values and subranges therebetween for each of the above ranges.

In the second embodiment, the coated seeds 10 can comprise, consist essentially of, or consist of about 50 weight percent seed 12, about 4.5 weight percent of the fertilizer composition, and about 45.5 weight percent of lime; a range of from about 37.5 weight percent seed to about 62.5 weight percent seed, a range of from about 3.3 weight percent of the fertilizer composition to about 5.6 weight percent of the fertilizer composition, and a range of from about 34 weight percent of lime to about 57 weight percent of lime, including all values and subranges therebetween for each of the above. Alternatively, the lime may be supplemented with, or replaced by, other suitable non-nutritive and/or nutritive material(s).

In third and fourth embodiments of this disclosure, the fertilizer composition is a 12-0-3+1% sulphur fertilizer composition. In the third and fourth embodiments, the fertilizer composition comprises, consists essentially of, or consists of a blend of: 46-0-0 fertilizer (e.g., commercially available as urea or UFLEXX® stabilized nitrogen fertilizer); 0-0-50 s fertilizer (e.g., sulfate of potassium); pulp-based filler (e.g., commercially available as Biodac® filler, which is a cellulose complex consisting of paper fiber (47-53%), kaolin clay (28-34%), calcium carbonate (14-20%), and titanium dioxide (no more than 1%)); and limestone.

Aspects of the third and fourth embodiments are expressed in tabular form in Tables 3 and 4 below, which include reference numerals from FIG. 2.

TABLE 3

| Components | 3rd Embodiment Amounts | 4th Embodiment Amounts |
|---|---|---|
| Grass seeds 12 (e.g., perennial ryegrass) | 25 grams | 25 grams |
| innermost layer 21: binder or sticker solution | 1 milliliter | 2 milliliter |
| layer 22: fertilizer composition | 5.21 grams | 10 grams |
| layer 23: binder or sticker solution | 1 milliliter | 1 milliliter |
| layer 24: fertilizer composition | 5.21 grams | 10.83 grams |
| layer 25: binder or sticker solution | 1 milliliter | none |
| layer 26: lime powder | 14.58 grams | 4.17 grams |
| outermost or exterior layer 27: binder or sticker solution | 3 milliliters | 3 milliliters |

TABLE 4

| Components | 3rd Embodiment Total Amounts | 4th Embodiment Total Amounts |
|---|---|---|
| Grass seeds 12 (e.g., perennial ryegrass) | 25 grams | 25 grams |
| binder or sticker solution | 6 milliliter | 6 milliliter |
| fertilizer composition | 10.42 grams | 20.83 grams |
| lime powder | 14.58 grams | 4.17 grams |

In the third embodiment, the fertilizer spread rate can be 0.25 pounds of nitrogen per 1000 square feet. In the fourth embodiment, the fertilizer spread rate can be 0.5 pounds of nitrogen per 1000 square feet.

A variety of variations are within the scope of this disclosure. For example, the pulp-based filler can be omitted from the composite coatings 14 of the third and fourth embodiments. As another example, the lime may be supplemented with, or replaced by, other suitable non-nutritive and/or nutritive material(s)

In accordance with a fifth embodiment, the fertilizer composition comprises, consists of, or consists essentially of 46-0-0 fertilizer (e.g., commercially available as urea or UFLEXX® stabilized nitrogen fertilizer). Aspects of the fifth embodiment are expressed in tabular form in Tables 5 and 6 below, which includes reference numerals from FIG. 2.

TABLE 5

| Components | Amounts |
|---|---|
| 5th Embodiment | |
| Grass seeds 12 (e.g., bermudagrass) | 225 grams |
| innermost layer 21: binder or sticker solution | 5 milliliter |
| layer 22: fertilizer composition | 40.76 grams |

TABLE 5-continued

| Components | Amounts |
|---|---|
| 5th Embodiment | |
| layer 23: binder or sticker solution | 10 milliliter |
| layer 24: fertilizer composition | 40.76 grams |
| layer 25: binder or sticker solution | 10 milliliter |
| layer 26: fertilizer composition | 40.76 grams |
| layer 27: binder or sticker solution | 10 milliliter |
| layer 28: lime powder | 51.36 grams |
| layer 29: binder or sticker solution | 5 milliliters |
| outermost or exterior layer 30: lime powder | 51.36 grams |

TABLE 6

| Components | Total Amounts |
|---|---|
| 5th Embodiment | |
| Grass seeds 12 (e.g., bermudagrass) | 225 grams |
| binder or sticker solution | 40 milliliter |
| fertilizer composition | 122.28 grams |
| lime powder | 102.72 grams |
| resulting dry coated seed | 456.5 grams |

In the fifth embodiment, the fertilizer spread rate can be 0.25 pounds of nitrogen per 1000 square. As another example, the lime may be supplemented with, or replaced by, other suitable non-nutritive and/or nutritive material(s)

In accordance with a sixth embodiment, the fertilizer composition comprises, consists of, or consists essentially of a blend of 46-0-0 fertilizer (e.g., commercially available as urea or UFLEXX® stabilized nitrogen fertilizer) and ammonium sulfate. Aspects of the sixth embodiment are expressed in tabular form in Tables 7 and 8 below, which include reference numerals from FIG. 2.

TABLE 7

| Components | Amounts |
|---|---|
| 6th Embodiment | |
| Grass seeds 12 (e.g., bermudagrass) | 225 grams |
| innermost layer 21: binder or sticker solution | 5 milliliter |
| layer 22: fertilizer composition | 38.76 grams |
| layer 23: binder or sticker solution | 10 milliliter |
| layer 24: fertilizer composition | 38.76 grams |
| layer 25: binder or sticker solution | 10 milliliter |
| layer 26: fertilizer composition | 38.76 grams |
| layer 27: binder or sticker solution | 10 milliliter |
| layer 28: fertilizer composition | 38.76 grams |
| layer 29: binder or sticker solution | 10 milliliter |
| layer 30: fertilizer composition | 38.76 grams |
| next outer layer: binder or sticker solution | 10 milliliter |
| outermost or exterior layer: lime powder | 31.19 grams |

TABLE 8

| Components Totals | Total Amounts |
|---|---|
| 6th Embodiment | |
| Grass seeds 12 (e.g., bermudagrass) | 225 grams |
| binder or sticker solution | 55 milliliter |
| 46-0-0 fertilizer | 61.14 grams |

TABLE 8-continued

6th Embodiment

| Components Totals | Total Amounts |
| --- | --- |
| ammonium sulfate | 132.67 grams |
| lime powder | 31.19 grams |
| resulting dry coated seed | 444.81 grams |

In the sixth embodiment, the 46-0-0 fertilizer spread rate can be 0.125 pounds of nitrogen per 1000 square feet, and the ammonium sulfate spread rate can be 0.125 pounds of nitrogen per 1000 square feet. As another example, the lime may be supplemented with, or replaced by, other suitable non-nutritive and/or nutritive material(s)

In each of the third through sixth embodiments, the approximate weight percentage of each of the layers (e.g., disregarding the binder or sticker coating layers), can be calculated, and it is believed that each weight percentage can vary by plus or minus about 25%, plus or minus about 20%, plus or minus about 15%, plus or minus about 10%, or plus or minus about 5%, including all values and subranges therebetween for each of the above ranges. Similarly for each of the third through sixth embodiments, the overall approximate weight percentages of the components of the coated seeds 10 can be calculated, and it is believed that each weight percentage can vary by plus or minus about 25%, plus or minus about 20%, plus or minus about 15%, plus or minus about 10%, or plus or minus about 5%, including all values and subranges therebetween for each of the above ranges.

In accordance with a seventh embodiment, the fertilizer composition comprises, consists of, or consists essentially of 46-0-0 fertilizer (e.g., commercially available as urea or UFLEXX® stabilized nitrogen fertilizer), and the fertilizer composition is mixed into the binder or sticker solution prior to the coating process. Aspects of the seventh embodiment are expressed in tabular form in Tables 9 and 10 below, which include reference numerals from FIG. 2.

TABLE 9

7th Embodiment

| Components | Amounts |
| --- | --- |
| Grass seeds 12 (e.g., tall fescue) | 225 grams |
| innermost layer 21: binder or sticker solution and fertilizer composition | 5 milliliter and 2.57 grams, respectively |
| layer 22: binder or sticker solution and fertilizer composition | 5 milliliter and 2.57 grams, respectively |
| layer 23: binder or sticker solution and fertilizer composition | 5 milliliter and 2.57 grams, respectively |
| layer 24: binder or sticker solution and fertilizer composition | 5 milliliter and 2.57 grams, respectively |
| layer 25: binder or sticker solution and fertilizer composition | 5 milliliter and 2.57 grams, respectively |
| layer 26: binder or sticker solution and fertilizer composition | 5 milliliter and 2.57 grams, respectively |
| layer 27: binder or sticker solution and fertilizer composition | 5 milliliter and 2.57 grams, respectively |
| outermost or exterior layer 28: binder or sticker solution and fertilizer composition | 5 milliliter and 2.57 grams, respectively |

TABLE 10

7th Embodiment

| Components | Total Amounts |
| --- | --- |
| Grass seeds 12 (e.g., tall fescue) | 225 grams |
| binder or sticker solution (without/before adding fertilizer composition) | 40.5 milliliter |
| fertilizer composition | 20.56 grams |
| resulting dry coated seed | 241.0 grams |

In the seventh embodiment, the 46-0-0 fertilizer spread rate can be 0.25 pounds of nitrogen per 1000 square feet, and the raw seed spread rate can be 6 pounds of seed 12 per 1000 square feet In accordance with an eighth embodiment, the fertilizer composition comprises, consists of, or consists essentially of a blend of 46-0-0 fertilizer (e.g., commercially available as urea or UFLEXX® stabilized nitrogen fertilizer) and calcium nitrate (e.g., 15.5-0-0 fertilizer), and the fertilizer composition is mixed into the binder or sticker solution prior to the coating process. Aspects of the eighth embodiment are expressed in tabular form in Tables 11 and 12 below, which include reference numerals from FIG. 2.

TABLE 11

8th Embodiment

| Components | Amounts |
| --- | --- |
| Grass seeds 12 (e.g., perineal ryegrass) | 300 grams |
| innermost layer 21: binder or sticker solution, 46-0-0 fertilizer and calcium nitrate | 5 milliliter, 2.29 grams, and 2.27 grams, respectively |
| layer 22: binder or sticker solution, 46-0-0 fertilizer and calcium nitrate | 5 milliliter, 2.29 grams, and 2.27 grams, respectively |
| layer 23: binder or sticker solution, 46-0-0 fertilizer and calcium nitrate | 5 milliliter, 2.29 grams, and 2.27 grams, respectively |
| layer 24: binder or sticker solution, 46-0-0 fertilizer and calcium nitrate | 5 milliliter, 2.29 grams, and 2.27 grams, respectively |
| layer 25: binder or sticker solution, 46-0-0 fertilizer and calcium nitrate | 5 milliliter, 2.29 grams, and 2.27 grams, respectively |
| layer 26: binder or sticker solution, 46-0-0 fertilizer and calcium nitrate | 5 milliliter, 2.29 grams, and 2.27 grams, respectively |
| layer 27: binder or sticker solution, 46-0-0 fertilizer and calcium nitrate | 5 milliliter, 2.29 grams, and 2.27 grams, respectively |
| layer 28: binder or sticker solution, 46-0-0 fertilizer and calcium nitrate | 5 milliliter, 2.29 grams, and 2.27 grams, respectively |
| layer 29: binder or sticker solution, 46-0-0 fertilizer and calcium nitrate | 5 milliliter, 2.29 grams, and 2.27 grams, respectively |
| layer 30: binder or sticker solution, 46-0-0 fertilizer and calcium nitrate | 5 milliliter, 2.29 grams, and 2.27 grams, respectively |
| outermost or exterior layer: binder or sticker solution, 46-0-0 fertilizer and calcium nitrate | 3.33 milliliter, 1.53 grams, and 1.51 grams, respectively |

TABLE 12

8th Embodiment

| Components Totals | Total Amounts |
|---|---|
| Grass seeds 12 (e.g., perennial ryegrass) | 300 grams |
| binder or sticker solution (without/before adding fertilizer composition) | 53.33 milliliter |
| 46-0-0 fertilizer | 24.46 grams |
| calcium nitrate | 24.19 grams |
| resulting dry coated seed | 339.3 grams |

In the eighth embodiment, the 46-0-0 fertilizer spread rate can be 0.1875 pounds of nitrogen per 1000 square feet; the calcium nitrate spread rate can be 0.0625 pounds of nitrogen per 1000 square feet, and the raw seed spread rate can be 5 pounds of seed 12 per 1000 square feet.

In accordance with a ninth embodiment, the fertilizer composition comprises, consists of, or consists essentially of a blend of 46-0-0 fertilizer (e.g., commercially available as urea or UFLEXX® stabilized nitrogen fertilizer) and calcium nitrate (e.g., 15.5-0-0 fertilizer), and the fertilizer composition is mixed into water prior to the coating process. Aspects of the ninth embodiment are expressed in tabular form in Tables 13 and 14 below, which include reference numerals from FIG. 2.

TABLE 13

9th Embodiment

| Components | Amounts |
|---|---|
| Grass seeds 12 (e.g., perennial ryegrass) | 300 grams |
| innermost layer 21: water, 46-0-0 fertilizer and calcium nitrate | 5 milliliter, 2.29 grams, and 2.27 grams, respectively |
| layer 22: water, 46-0-0 fertilizer and calcium nitrate | 5 milliliter, 2.29 grams, and 2.27 grams, respectively |
| layer 23: water, 46-0-0 fertilizer and calcium nitrate | 5 milliliter, 2.29 grams, and 2.27 grams, respectively |
| layer 24: water, 46-0-0 fertilizer and calcium nitrate | 5 milliliter, 2.29 grams, and 2.27 grams, respectively |
| layer 25: water, 46-0-0 fertilizer and calcium nitrate | 5 milliliter, 2.29 grams, and 2.27 grams, respectively |
| layer 26: water, 46-0-0 fertilizer and calcium nitrate | 5 milliliter, 2.29 grams, and 2.27 grams, respectively |
| layer 27: water, 46-0-0 fertilizer and calcium nitrate | 5 milliliter, 2.29 grams, and 2.27 grams, respectively |
| layer 28: water, 46-0-0 fertilizer and calcium nitrate | 5 milliliter, 2.29 grams, and 2.27 grams, respectively |
| layer 29: water, 46-0-0 fertilizer and calcium nitrate | 5 milliliter, 2.29 grams, and 2.27 grams, respectively |
| layer 30: water, 46-0-0 fertilizer and calcium nitrate | 5 milliliter, 2.29 grams, and 2.27 grams, respectively |
| outermost or exterior layer: water, 46-0-0 fertilizer and calcium nitrate | 3.33 milliliter, 1.53 grams, and 1.51 grams, respectively |

TABLE 14

9th Embodiment

| Components Totals | Total Amounts |
|---|---|
| Grass seeds 12 (e.g., perineal ryegrass) | 300 grams |
| water (without/before adding fertilizer composition) | 53.33 milliliter |
| 46-0-0 fertilizer | 24.46 grams |
| calcium nitrate | 24.19 grams |
| resulting dry coated seed | 339.3 grams |

In the ninth embodiment, the 46-0-0 fertilizer spread rate can be 0.1875 pounds of nitrogen per 1000 square feet, the calcium nitrate spread rate can be 0.0625 pounds of nitrogen per 1000 square feet, and the raw seed spread rate can be 5 pounds of seed 12 per 1000 square feet.

In accordance with a tenth embodiment, a fertilizer composition comprises, consists of, or consists essentially of urea fertilizer (e.g., 46-0-0 fertilizer such as but not limited to UFLEXX® stabilized nitrogen fertilizer) and calcium nitrate fertilizer (e.g., 15.5-0-0 fertilizer), and the fertilizer composition is optionally mixed with a binder or sticker solution prior to the coating process to form a wet coating composition.

In some embodiments, the wet coating solution includes urea fertilizer and calcium nitrate fertilizer without a binder or sticker solution. In some embodiments, the wet coating solution includes urea fertilizer, calcium nitrate fertilizer, and a binder or sticker solution.

In exemplary embodiments, the fertilizer composition can be mixed with water, for example to dissolve the fertilizer. In exemplary embodiments, the fertilizer composition can be mixed with water prior to, concurrently with, and/or after mixing the fertilizer composition with a binder or sticker solution.

Examples of urea fertilizer include without limitation UFLEXX® stabilized nitrogen fertilizer, UMAXX® stabilized nitrogen fertilizer (UFLEXX® and UMAXX® are commercially available from KOCH Turf & Ornamental); and/or agricultural grade urea.

In the tenth embodiment, the coated seed can include two or more layers, for example three, four, five, or more layers including urea, calcium nitrate, and optionally polymeric binder.

In the tenth embodiment, the coated seed can include two or more layers, for example three, four, five, or more layers including a non-nutritive material such as lime, as discussed in more detail herein.

In the tenth embodiment, the coated seed can include two or more layers, for example three, four, five, or more layers including a nutritive material, as also discussed in more detail herein. The nutritive material can include a secondary nutrient (e.g., Ca, Mg, and/or S) and/or a micronutrient (e.g. Fe, Mn, Zn, Cu, Mo, B, and/or Cl). In some embodiments, the coated seed can include two or more layers, for example three, four, five, or more layers including a nutritive material such as gypsum.

In some embodiments, as will be understood by the skilled artisan, the calcium nitrate fertilizer can include and/or be derived from calcium ammonium nitrate double salt.

In the tenth embodiment, the weight ratio of urea fertilizer (e.g., 46-0-0 fertilizer) to calcium nitrate fertilizer (e.g., 15.5-0-0 fertilizer) in the fertilizer composition can vary. The weight ratio of urea fertilizer:calcium nitrate fertilizer can range, for example, from about 95:5 urea fertilizer:calcium nitrate fertilizer to about 5:95 urea fertilizer:calcium nitrate fertilizer, for example from about 30:70 urea fertilizer:calcium nitrate fertilizer to about 10:90 urea fertilizer:calcium nitrate fertilizer, and as another example from about 30:70 urea fertilizer:calcium nitrate fertilizer to about 15:85 urea fertilizer:calcium nitrate fertilizer. For example, the weight ratio of urea fertilizer:calcium nitrate fertilizer can be about 95:5 urea fertilizer:calcium nitrate fertilizer; about 80:20 urea fertilizer:calcium nitrate fertilizer; about 50:50 urea fertilizer:calcium nitrate fertilizer; about 30:70 urea fertilizer:calcium nitrate fertilizer; about 25:75 urea fertilizer:calcium nitrate fertilizer; about 20:80 urea fertilizer:calcium nitrate fertilizer; about 15:85 urea fertilizer:calcium nitrate fertilizer; or about 10:90 urea fertilizer:calcium nitrate fertilizer. The above ranges include all values and subranges therebetween.

In the tenth embodiment, the approximate weight ratio of urea fertilizer:calcium nitrate fertilizer can be calculated, and it is believed that each weight ratio can vary by plus or minus about 258, plus or minus about 20%, plus or minus about 15%, plus or minus about 10%, plus or minus about 5%, plus or minus about 18, or less than about 1%, including all values and subranges therebetween for each of the above ranges.

The binder or sticker solution of the tenth embodiment can include a mixture of a polymeric binder and solvent, e.g. water, such as discussed in more detail herein. For example, the binder or sticker solution can include a mixture of a seed coating polymer known in the art and water.

As a non-limiting example, the binder or sticker solution can include a concentrated form (a concentrate) of a seed coating polymer in water, such as but not limited to UNI-COAT™ seed coating polymer (e.g., consisting of 36-38% water and 62-64% natural and proprietary polymers and colorants). The concentrate of seed coating polymer can optionally be diluted with water prior to, concurrently with, and/or after being mixed with the fertilizer composition to form the wet coating composition of the tenth embodiment. For example, one part of the concentrated form of UNI-COAT™ seed coating polymer can be mixed with one part water, two parts water, three parts water, four parts waters, five parts water, or six parts water to form the binder or sticker solution (e.g. a polymer concentrate:water ratio ranging from about 1:1 to about 1:6 (v/v)). In some embodiments, the polymer concentrate:water ratio can be about 1:1, 1:1.5, 1:2, 1:2.5, 1:3, 1:3.5, 1:4, 1:4.5, 1:5, 1:5.5, or 1:6. The above range includes all values and subranges therebetween. The approximate ratio of polymer:water can be calculated, and it is believed that each ratio can vary by plus or minus about 25%, plus or minus about 20%, plus or minus about 15%, plus or minus about 10%, plus or minus about 5%, plus or minus about 1%, or less than about 18, including all values and subranges therebetween for each of the above ranges.

In the tenth embodiment, the wet coating composition can include about 5 weight percent to about 30 weight percent, for example about 10 weight percent to about 25 weight percent, and as another example about 15 weight percent to about 22 weight percent calcium nitrate; about 0.1 weight percent to about 15 weight percent, for example about 1 weight percent to about 12 weight percent, and as another example about 4 weight percent to about 10 weight percent urea; and optionally about 0.1 weight percent to about 10 weight percent, for example about 0.5 weight percent to about 5 weight percent, and as another example about 1 weight percent to about 3 weight percent ammonium nitrate, based on the total weight of the wet coating composition. The above ranges further include all values and subranges therebetween for each of the above components.

The balance of the wet coating composition can include the binder or sticker solution and/or other optional components e.g., other chemical additives (other fertilizers such as described herein) and/or other non-nutritive and/or nutritive materials (e.g., talc, pulp-based filler, clay, titanium dioxide, and/or limestone) and/or additional solvent (e.g. water). For example, the balance of the wet coating composition can include the binder or sticker solution and/or additional solvent, e.g. water.

In the tenth embodiment, the approximate weight percentage of the components of the wet coating composition can be calculated, and it is believed that each weight percentage can vary by plus or minus about 25%, plus or minus about 20%, plus or minus about 15%, plus or minus about 10%, plus or minus about 5%, plus or minus about 1%, or less than about 1%, including all values and subranges therebetween for each of the above ranges.

In the tenth embodiment, the composite coating can include about 2 weight percent to about 15 weight percent, for example about 5 weight percent to about 12 weight percent, and as another example about 6 weight percent to about 10 weight percent calcium nitrate; about 0.1 weight percent to about 10 weight percent, for example about 0.5 weight percent to about 5 weight percent, and as another example about 1 weight percent to about 3 weight percent urea; and optionally about 0.01 weight percent to about 10 weight percent, for example about 0.1 weight percent to about 5 weight percent, and as another example about 0.5 weight percent to about 3 weight percent ammonium nitrate, based on the total weight of the composite coating. The above ranges further include all values and subranges therebetween for each of the above components.

The balance of the composite coating can include the polymeric binder (the solvent, e.g., water of the binder or sticker solution having evaporated as a part of the coating process to make the composite coating), lime, gypsum, and/or other optional components e.g., other chemical additives (other fertilizers such as described herein) and/or other non-nutritive and/or nutritive material (e.g., talc, pulp-based filler, clay, and/or titanium dioxide). For example, the balance of the composite coating can include polymeric binder and/or lime and/or gypsum.

In the tenth embodiment, the approximate weight percentage of the components of the composite coating can be calculated, and it is believed that each weight percentage can vary by plus or minus about 25%, plus or minus about 20%, plus or minus about 15%, plus or minus about 10%, plus or minus about 5%, plus or minus about 1%, or less than about 1%, including all values and subranges therebetween for each of the above ranges.

In examples of the tenth embodiment, the coated seed can include a total amount of urea fertilizer and calcium nitrate fertilizer of about 2 weight percent to about 15 weight percent, for example about 4 weight percent to about 10 weight percent, based on the total weight (100 weight percent) of the coated seed. For example, the coated seed including a composite coating of the tenth embodiment can include about 4 weight percent, about 5 weight percent, about 6 weight percent, about 7 weight percent, or about 8 weight percent of urea fertilizer and calcium nitrate fertilizer, based on the total weight of the coated seed. The above range includes all values and subranges therebetween. The approximate weight percentage of urea fertilizer and calcium nitrate fertilizer of the coated seed can be calculated, and it is believed that each weight percentage can vary by plus or minus about 25%, plus or minus about 20%, plus or minus about 15%, plus or minus about 10%, plus or minus about 5%, plus or minus about 18, or less than about 18, including all values and subranges therebetween for each of the above ranges.

In an example of the tenth embodiment, the composite coating can include at least four successive layers respectively extending at least partially around one another, at least two of the layers can be spaced apart from one another and include fertilizer and optionally a polymeric binder, the fertilizer including urea and calcium nitrate, and at least two other of the layers can be spaced apart from one another and include a non-nutritive material and/or a nutritive material, such lime and/or gypsum, respectively.

For example, the composite coating according to the tenth embodiment can include at least four successive layers including a first layer extending at least partially around grass seed, a second layer extending at least partially around the first layer, a third layer extending at least partially around the second layer, and a fourth layer extending at least partially around the third layer. In exemplary embodiments, the first and third layers can include fertilizer and optionally a polymeric binder, the fertilizer including urea and calcium nitrate, and the second and fourth layers can include lime. In other exemplary embodiments, the first and third layers can include fertilizer and optionally a polymeric binder, the fertilizer including urea and calcium nitrate, and the second and fourth layers can include gypsum.

The skilled artisan will understand that the lime and/or gypsum used in the tenth embodiment can include lime and/or gypsum materials suitable for use in agricultural applications, such as but not limited to calcitic lime (calcium carbonate), dolomitic lime (calcium magnesium carbonate), and/or gypsum (e.g., calcium sulphate ($CaSO_4$, $CaSO_4 \cdot 2H_2O$, and/or $CaSO_4 \cdot \frac{1}{2}H_2O$; and/or recycled gypsum, e.g. recovered from recycled drywall). Quick lime (calcium oxide) and/or hydrated lime (calcium hydroxide; also called slaked lime) can be used in addition to or as an alternative to one or more of the foregoing limes and/or gypsum.

In another example, one or more additional successive layers can be included in addition to the at least four successive layers. For example, the composite coating can include at least eight or more successive layers respectively extending at least partially around one another.

In an example, the composite coating can include a fifth layer extending at least partially around the fourth layer, a sixth layer extending at least partially around the fifth layer, a seventh layer extending at least partially around the sixth layer, and an eighth layer extending at least partially around the seventh layer.

In an example, the fifth and seventh layers can include fertilizer and optionally polymeric binder, the fertilizer including urea and calcium nitrate. In an example, the sixth and eighth layers can include a non-nutritive material such as lime. In another example, the sixth and eighth layers can include a nutritive material such as gypsum.

In other examples, the composite coating can further include a ninth layer extending at least partially around the eighth layer.

In an example, the first, third, fifth, seventh, and ninth layers of the composite coating can include fertilizer and optionally polymeric binder, the fertilizer including urea and calcium nitrate; and the second, fourth, sixth, and eighth layers of the composite coating can include a non-nutritive material such as lime. In an example, the first, third, fifth, and seventh layers of the composite coating can include fertilizer and optionally polymeric binder, the fertilizer including urea and calcium nitrate; the second, fourth, sixth, and eighth layers of the composite coating can include a non-nutritive material such as lime; and the ninth layer can include a polymeric binder. In another example, the first, third, fifth, seventh, and ninth layers of the composite coating can include fertilizer and optionally polymeric binder, the fertilizer including urea and calcium nitrate; and the second, fourth, sixth, and eighth layers of the composite coating can include a nutritive material such as gypsum. In another example, the first, third, fifth, and seventh layers of the composite coating can include fertilizer and optionally polymeric binder, the fertilizer including urea and calcium nitrate; the second, fourth, sixth, and eighth layers of the composite coating can include a nutritive material such as gypsum; and the ninth layer can include a polymeric binder.

In other examples, the composite seed can include a tenth layer extending at least partially around the ninth layer. The tenth layer can include a polymeric binder. For example, the first, third, fifth, seventh, and ninth layers of the composite coating can include fertilizer and optionally polymeric binder, the fertilizer including urea and calcium nitrate; the second, fourth, sixth, and eighth layers of the composite coating can include a non-nutritive material such as lime; and the tenth layer can include a polymeric binder. In another example, the first, third, fifth, seventh, and ninth layers of the composite coating can include fertilizer and optionally polymeric binder, the fertilizer including urea and calcium nitrate; the second, fourth, sixth, and eighth layers of the composite coating can include a nutritive material such as gypsum; and the tenth layer can include a polymeric binder.

In other examples, the composite seed can include an eleventh layer extending at least partially around the tenth layer and a twelfth layer extending at least partially around the eleventh layer.

The tenth embodiment is not limited to the foregoing. The composite coating can include more layers, for example up to fifteen layers, or more. For example, the composite coating can include range of from four to fifteen layers, including all values and subranges therebetween. As other examples, there may be less than four layers or more than fifteen layers.

In an example of the tenth embodiment, the composite coating can include a layer(s) including fertilizer and optionally a polymeric binder, the fertilizer including urea and calcium nitrate, alternating with a layer(s) including lime and/or gypsum. In other examples according to the tenth embodiment, the composite coating can include adjacent layers (two, three, four, or more adjacent layers) including fertilizer and optionally a polymeric binder, the fertilizer including urea and calcium nitrate and/or adjacent layers (two, three, four, or more adjacent layers) including lime and/or gypsum. In other examples of the tenth embodiment, the composite coating can include combinations of alternating layers including fertilizer and optionally a polymeric binder, the fertilizer including urea and calcium nitrate, and layers including lime and/or gypsum; and/or adjacent layers (two, three, four, or more adjacent layers) including fertilizer and optionally a polymeric binder, the fertilizer including urea and calcium nitrate, and/or adjacent layers (two, three, four, or more adjacent layers) including lime and/or gypsum.

In an example of the tenth embodiment, the outermost or exterior layer of the plurality of layers can include lime and/or gypsum.

As another example of the tenth embodiment, the outermost or exterior layer of the plurality of layers can include fertilizer and optionally a polymeric binder, the fertilizer including urea and calcium nitrate.

As another example of the tenth embodiment, the outermost or exterior layer of the plurality of layers can include a polymeric binder. The polymeric binder can be applied as a concentrated form (a concentrate) of a seed coating polymer in water, such as the UNICOAT™ seed coating polymer concentrate described herein (e.g., consisting of 36-38% water and 62-64% natural and proprietary polymers and colorants). The concentrate of a seed coating polymer can be diluted with water prior to application as the outermost or exterior layer, for example, one part of the concentrated form of a seed coating polymer can be mixed with one part water, two parts water, three parts water, four parts waters, five parts water, or six parts water (e.g. a polymer concentrate:water ratio ranging from about 1:1 to about 1:6 (v/v)). The above range includes all values and subranges therebetween. The approximate ratio of polymer:water can be calculated, and it is believed that each ratio can vary by plus or minus about 25%, plus or minus about 20%, plus or minus about 15%, plus or minus about 10%, plus or minus about 58, plus or minus about 1%, or less than about 1%, including all values and subranges therebetween for each of the above ranges.

In an example of the tenth embodiment, the wet coating composition and the non-nutritive material and/or nutritive material, e.g., lime and/or gypsum can be serially applied to form the desired number and sequence of coatings (e.g., apply the wet coating composition to the seed to form a first layer including fertilizer and polymeric binder; apply lime and/or gypsum to the first layer to form a layer including lime and/or gypsum; etc.).

In an example, the composite seed coating can be prepared using substantially equal weights of seed:non-nutritive material and/or nutritive material (e.g., lime and/or gypsum)+fertilizer (e.g., about 1:1 weight ratio of seed:lime and/or gypsum+urea fertilizer+calcium nitrate fertilizer). In an example, the composite seed coating can be prepared using substantially equal weights of seed:lime+fertilizer (e.g., about 1:1 weight ratio of seed:lime+urea fertilizer+calcium nitrate fertilizer). In an example, the composite seed coating can be prepared using substantially equal weights of seed:gypsum+fertilizer (e.g., about 1:1 weight ratio of seed:gypsum+urea fertilizer+calcium nitrate fertilizer). The approximate ratio of seed:non-nutritive material and/or nutritive material+urea fertilizer+calcium nitrate fertilizer can be calculated, and it is believed that the weight ratio can vary by plus or minus about 25%, plus or minus about 20%, plus or minus about 15%, plus or minus about 10%, plus or minus about 58, plus or minus about 1%, or less than about 1%.

In an example, the composite seed coating can be prepared using substantially equal weights of seed+fertilizer:non-nutritive material and/or nutritive material, e.g., lime and/or gypsum (e.g., about 1:1 weight ratio of seed+urea fertilizer+calcium nitrate fertilizer:lime and/or gypsum). In an example, the composite seed coating can be prepared using substantially equal weights of seed+fertilizer:lime (e.g., about 1:1 weight ratio of seed+urea fertilizer+calcium nitrate fertilizer:lime). In an example, the composite seed coating can be prepared using substantially equal weights of seed+fertilizer:gypsum (e.g., about 1:1 weight ratio of seed+urea fertilizer+calcium nitrate fertilizer:gypsum). The approximate ratio of seed+urea fertilizer+calcium nitrate fertilizer:non-nutritive material and/or nutritive material can be calculated, and it is believed that the weight ratio can vary by plus or minus about 25%, plus or minus about 20%, plus or minus about 15%, plus or minus about 10%, plus or minus about 5%, plus or minus about 18, or less than about 1%.

In an example, substantially equal amounts of the wet coating composition can be applied in separate steps to form two or more layers including fertilizer and optionally polymeric binder with substantially equal weights and/or thicknesses. In an example, different amounts of the wet coating composition can be applied in separate steps to form two or more layers including fertilizer and optionally polymeric binder with different weights and/or thicknesses. In an example, substantially equal amounts of the non-nutritive material and/or nutritive material, such as lime and/or gypsum can be applied in separate steps to form two or more layers including non-nutritive material and/or nutritive material, such as lime and/or gypsum with substantially equal weights and/or thicknesses. In an example, different amounts of the non-nutritive material and/or nutritive material, such as lime and/or gypsum can be applied in separate steps to form two or more layers including non-nutritive material and/or nutritive material, such as lime and/or gypsum with different weights and/or thicknesses. The skilled artisan will understand that some variations in layer weight/thickness of the composite coating are typical in agricultural coating processes, and as used herein, the term "substantially" can indicate a variance of plus or minus about 25%, for example plus or minus about 20%, for example plus or minus about 15%, for example plus or minus about 10%, for example plus or minus about 58, as another example plus or minus about 1%, and as another example less than about 1%.

Examples of the tenth embodiment are expressed in tabular form in Tables 15 and 16, which includes reference numerals from FIG. 2, and also in Tables 17, 18, 19, and 20 below.

The numerical values in the tables below are examples of quantities of components that can be used in the tenth embodiment. The skilled artisan will understand that the values set forth in the tables below can be approximate and that some variations can be typical, for example based on factors such as accuracy and/or precision of measurements, instrumentation, variations typical in agricultural coating processes, etc. The skilled artisan will also understand that numerical ranges disclosed in the tables below include all values and subranges therebetween. It is believed that the numerical values can vary by plus or minus about 25%, plus or minus about 20%, plus or minus about 15%, plus or minus about 10%, plus or minus about 5%, plus or minus about 1%, or less than about 1%, including all values and subranges therebetween.

TABLE 15

10th Embodiment
Fertilizer composition + lime + seed can include 6 wt % total fertilizer (urea + calcium nitrate) and 94 wt % seed + lime, based on 100 wt % seed + lime + total fertilizer

| Components | Amounts |
|---|---|
| Grass seeds 12 (e.g., tall fescue) | 454 grams, which amount can be reduced by 1 wt % to 6 wt %, for example, reduced by 1 wt %, 2 wt %, 3 wt %, 4 wt %, 5 wt % or 6 wt %, depending on amount of lime used, to provide a total wt % of seed + lime of 94 wt %, based on 100 wt % seed + lime + total fertilizer |
| Wet coating composition: | Fertilizer composition: calcium nitrate and urea (e.g., 15.5-0-0 and 46-0-0 fertilizers) in a weight ratio of calcium |

TABLE 15-continued

10th Embodiment
Fertilizer composition + lime + seed can include 6 wt % total fertilizer (urea + calcium nitrate) and 94 wt % seed + lime, based on 100 wt % seed + lime + total fertilizer

| Components | Amounts |
|---|---|
| Fertilizer composition + water + polymer binder | nitrate: urea of 74.8%: 25.2%; Total amount fertilizer: 54.5 g<br>Water: 85-95 ml<br>Polymer Binder (concentrate): 5 ml<br>Total solution volume: 90-100 ml |
| Lime (and/or other coating product such as gypsum) | 454 grams, which amount can be reduced by 1 wt % to 6 wt %, for example, reduced by 1 wt %, 2 wt %, 3 wt %, 4 wt %, 5 wt % or 6 wt %, depending on amount of seed used, to provide a total wt % of seed + lime of 94 wt %, based on 100 wt % seed + lime + total fertilizer |
| binder or sticker solution (outermost layer): (1:1 polymer binder concentrate: water, v/v) Layers on seed: | 7.5 mL polymer binder concentrate + 7.5 mL water for total 15 milliliters |
| innermost layer 21: wet coating composition | 22.5 milliliters |
| layer 22: lime powder | 113 grams |
| layer 23: wet coating composition | 22.5 milliliters |
| layer 24: lime powder | 113 grams |
| layer 25: wet coating composition | 22.5 milliliters |
| layer 26: lime powder | 113 grams |
| layer 27: wet coating composition | 22.5 milliliters |
| layer 28: lime powder | 113 grams |
| layer 29: wet coating composition (optional, when present can proportionally increase amount of polymer concentrate and/or water of wet coating composition to increase total volume of wet coating solution) | 22.5 milliliters |
| layer 30: binder or sticker solution (1:1 polymer binder concentrate: water, v/v) | 15 milliliters |

TABLE 16

10th Embodiment
Exemplary ranges of amounts of coating components

| Components | Amounts |
|---|---|
| Grass seeds 12 (e.g., tall fescue) | 454 grams, which amount can be reduced by 1 wt % to 8 wt %, for example, reduced by 1 wt %, 2 wt %, 3 wt %, 4 wt %, 5 wt %, 6 wt %, 7 wt %, or 8 wt %, depending on amount of lime (and/or other coating material such as gypsum) used, to provide a total wt % of seed + lime (and/or other coating material) of 92 wt % to 96 wt %, based on 100 wt % seed + lime (and/or other coating material) + total fertilizer |
| Wet coating composition: Fertilizer composition (calcium nitrate and urea, e.g., 15.5-0-0 and 46-0-0, fertilizers) + water + polymer binder concentrate | Fertilizer composition: Total amount of calcium nitrate and urea (e.g., 15.5-0-0 and 46-0-0 fertilizers) can range from 30 grams to 75 grams; weight ratio urea: calcium nitrate can range from 5:95 to 95:5<br>Water: 75-115 ml<br>Polymer Binder (concentrate) 5 ml to 25 mL<br>Total solution volume: 80-140 ml<br>Fertilizer composition + lime and/or gypsum + seed can include, for example, 4% to 8%, as another example 4%, 6% or 8%, total fertilizer (total urea and calcium nitrate fertilizer) |
| Lime (or other coating product such as gypsum) | 454 grams, which amount can be reduced by 1 wts to 8 wt %, for example, reduced by 1 wt %, 2 wt %, 3 wt %, 4 wt %, 5 wt %, 6 wt %, 7 wt %, or 8 wt %, depending on amount of seed used, to provide a total wt % of seed + lime (and/or other coating material) of 92 wt % to 96 wt %, based on 100 wt % seed + lime (and/or other coating material) + total fertilizer |
| Outermost layer: Can be formed using binder or sticker solution: (1:1 polymer binder concentrate: water, v/v); or Can be formed using wet coating composition Layers on seed: | 10 to 20 mL |
| layer 21: wet coating composition | 16 to 35 milliliters (can vary, for example, based on 4 or 5 coating layers) |
| layer 22: lime powder | 95 to 113 grams |
| layer 23: wet coating composition | 16 to 35 milliliters (amount can vary, for example, based on 4 or 5 coating layers) |
| layer 24: lime powder | 95 to 113 grams |
| layer 25: wet coating composition | 16 to 35 milliliters |
| layer 26: lime powder | 95 to 113 grams |
| layer 27: wet coating composition | 16 to 35 milliliters (amount can vary, for example, based on 4 or 5 coating layers) |
| layer 28: lime powder | 95 to 113 grams |
| Layer 29: wet coating composition (optional, when present can proportionally increase amount of polymer concentrate and/or water of wet coating composition to increase total volume of wet coating solution) | 16 to 35 milliliters (amount can vary, for example, based on 4 or 5 coating layers) |
| outermost or exterior layer 30: binder or sticker solution (1:1 polymer binder concentrate: water ratio, v/v) or wet coating composition | 10-20 milliliters |

Tables 15 and 16 list exemplary layers of an example of a composite coating. The composite coating can include fewer or more layers of the fertilizer composition/polymeric binder and/or fewer or more layers of lime (and/or gypsum, as an alternative to or in addition to lime). The composite coating can further include alternating layers of the fertilizer composition/polymeric binder and lime (and/or gypsum) and/or multiple adjacent layers of the fertilizer composition/ polymeric binder and/or lime (and/or gypsum). The composite coating according to the tenth embodiment can also include an outermost or exterior layer comprising the fertilizer composition and/or lime and/or gypsum and/or polymeric binder.

Table 17 below reports amounts of calcium nitrate, ammonium nitrate, and urea of an exemplary wet coating composition as described in Table 15 above that can be used to prepare a composite coating of the tenth embodiment. The wet coating composition includes water, polymer concentrate, and a weight ratio of fertilizers urea (46-0-0):calcium nitrate (15.5-0-0) of about 25:75 as described in Table 15 above. The total amounts of calcium nitrate, ammonium nitrate, and urea are identified using HPLC, Ion chromatography using techniques known in the art.

TABLE 17

| 10th Embodiment | |
|---|---|
| Component totals of Wet Coating Solution including 25 wt % 46-0-0/75 wt % calcium nitrate in binder or sticker solution | Total Amounts |
| Calcium nitrate | 18.96% |
| Ammonium nitrate | 1.90% |
| Urea | 6.9% |

Table 18 below reports total amounts of calcium nitrate, ammonium nitrate, urea, and calcium hydroxide of an exemplary composite coating described in Table 15 above prepared using the exemplary wet coating composition of Table 17 and lime, wherein seed is coated with the wet coating composition and lime, and the coating washed off the seed and analyzed using HPLC, Ion chromatography using techniques known in the art.

TABLE 18

| 10th Embodiment | |
|---|---|
| Component Totals of Composite Coating | Total Amounts |
| Calcium nitrate | 8.01% |
| Calcium hydroxide | 52.24% |

TABLE 18-continued

| 10th Embodiment | |
|---|---|
| Component Totals of Composite Coating | Total Amounts |
| Ammonium nitrate | 0.81% |
| Urea | 1.63% |

Although not wanting to be bound by any explanation or theory of the invention, it is currently believed that the use of a weight ratio of urea:calcium nitrate of about 25:75 (and possibly lower amounts of urea in the urea/calcium nitrate mixture) in the wet coating composition can result in various unexpected benefits, such as unexpected product stability (e.g., product shelf life of up to six months, 12 months and longer) and unexpected seed viability lifetimes (e.g., high percentage seed germination after storage for six months, 12 months, and longer), as compared, for example, to the same coated seed but including urea as the only fertilizer. The results of Table 18 after lime is added, for example with respect to the amounts and/or weight ratio of urea and calcium nitrate, which can change relative to the weight ratio before lime is added, are also unexpected. Again without being bound by any explanation or theory, it is currently believed the release of ammonium by the urea is accelerated in the presence of lime, and that calcium nitrate interacts with/binds ammonium to help preserve the functionality of the coated seed product (evidenced for example by extended shelf life and seed viability). In some embodiments, such as illustrated by Tables 17 and 18 above, it is believed that the composite coating can include calcium nitrate:urea in a weight ratio of about 70:30 to about 90:10, for example, a weight ratio of about 70:30 to about 85:15, for example, a weight ratio of about 75:25 to about 85:15, for example, a weight ratio of about 80:20 to about 90:10, for example, a weight ratio of about 80:20 to about 85:15. The above ranges include all values and subranges therebetween and it is believed that the weight ratios can vary by plus or minus about 25%, plus or minus about 20%, plus or minus about 15%, plus or minus about 10%, plus or minus about 5%, plus or minus about 1%, or less than about 1%, including all values and subranges therebetween for each of the above ranges.

Table 19 below includes other examples of amounts of seed, lime, urea fertilizer, calcium nitrate fertilizer, polymeric binder (concentrate) and water that can be used to make various exemplary agricultural products including seed and a composite coating according to the tenth embodiment.

TABLE 19

| Weight ratio urea:calcium nitrate | Total % fertilizer (urea + calcium nitrate) based on total weight seed + lime + fertilizer | Raw Seed (g) | Lime (g) | urea (g) | Calcium Nitrate (g) | Polymeric binder concentrate (ml) | water (ml) |
|---|---|---|---|---|---|---|---|
| 95:5 | 4% | 454 | 416.8 | 34.49 | 1.82 | 22 | 108.2 |
| 80:20 | 4% | 454 | 416.8 | 29.04 | 7.26 | 22 | 108.2 |
| 50:50 | 4% | 454 | 416.8 | 18.15 | 18.15 | 22 | 108.2 |
| 25:75 | 4% | 454 | 416.8 | 9.15 | 27.15 | 22 | 108.2 |
| 95:5 | 8% | 454 | 379.5 | 68.97 | 3.63 | 21.5 | 98.3 |
| 80:20 | 8% | 454 | 379.5 | 58.08 | 14.52 | 21.5 | 98.3 |
| 50:50 | 8% | 454 | 379.5 | 36.30 | 36.30 | 21.5 | 98.3 |
| 25:75 | 8% | 454 | 379.5 | 18.30 | 54.30 | 21.5 | 98.3 |

Table 20 below includes examples of amounts of seed, lime, urea fertilizer, calcium nitrate fertilizer, polymeric binder (concentrate) and water that can be used to make other various exemplary agricultural products including seed and a composite coating according to the tenth embodiment.

TABLE 20

| Weight ratio urea:calcium nitrate | Total % fertilizer (urea + calcium nitrate) based on total weight seed + lime + fertilizer | Raw Seed (g) | Lime (g) | urea (g) | Calcium Nitrate (g) | Water to dissolve fertilizer (ml) | Polymeric binder concentrate added to fertilizer + water (mL) | Polymer solution (ml) applied as exterior coating | |
|---|---|---|---|---|---|---|---|---|---|
| | | | | | | | | Polymeric binder concentrate (ml) | water (ml) |
| 25:75 | 4% | 454 | 417.7 | 9.15 | 27.15 | 90 | 5 | 10 | 10 |
| 25:75 | 6% | 454 | 399.55 | 13.72 | 40.73 | 85 | 5 | 7.5 | 7.5 |
| 25:75 | 8% | 454 | 381.4 | 18.30 | 54.30 | 80 | 5 | 5 | 5 |

In the tenth embodiment, the 46-0-0 fertilizer spread rate can be 0.1875 pounds of nitrogen per 1000 square feet; the calcium nitrate spread rate can be 0.0625 pounds of nitrogen per 1000 square feet.

An exemplary method of producing a coated seed according to the tenth embodiment can include: mixing urea fertilizer and calcium nitrate fertilizer to form a fertilizer mixture; optionally adding water to the fertilizer mixture to dissolve the fertilizer mixture; adding a binder or sticker solution to the fertilizer mixture to form a wet coating composition; coating seed with the wet coating composition to form a first layer extending at least partially around the seed; coating the first layer with lime and/or gypsum to form a second layer extending at least partially around the first layer; and sequentially forming additional layers of the wet coating composition and/or lime and/or gypsum.

A method of coating seed in accordance with the tenth embodiment can comprise, consist of, or consist essentially of:
  Mixing water, urea fertilizer, calcium nitrate fertilizer, and polymer concentrate to dissolve the fertilizer and form a wet coating composition;
  Mixing water and polymer concentrate in a ratio of 1:1 (v/v) to form a sealing composition (to form an exterior layer);
  Delivering a predetermined amount of seed to a coater;
  Applying a $1^{st}$ coating of the wet coating composition to the seed;
  Applying a $1^{st}$ coating of lime to the seed;
  Applying a 2nd coating of the wet coating composition to the seed;
  Applying a 2nd coating of lime to the seed;
  Applying a 3rd coating of the wet coating composition to the seed;
  Applying a 3rd coating of lime to the seed;
  Applying a 4th coating of the wet coating composition to the seed;
  Applying a 4th coating of lime to the seed; Applying a 5th coating of the wet coating composition to the seed; and
  Applying the sealing composition to the seed.

For example, and reiterating from above, all numerical values, ranges, percentages, etc., provided throughout this disclosure, including the tenth embodiment, can be approximate, and that some variations can be typical, for example based on factors such as accuracy and/or precision of measurements, instrumentation, variations typical in agricultural coating processes, etc. Also for example, and reiterating from above, for each range specified in this disclosure, all values within the range and all subranges within the range are also disclosed. Also for example, and reiterating from above, all numerical values, ranges, percentages, etc., provided throughout this disclosure, including the tenth embodiment, can be calculated, and it is believed that each can vary by plus or minus about 25%, plus or minus about 20%, plus or minus about 15%, plus or minus about 10%, plus or minus about 58, plus or minus about 18, or less than about 1%, including all values and subranges therebetween for each of the above ranges.

In each of the seventh through tenth embodiments, the approximate weight percentage of each of the layers (e.g., disregarding the water), can be calculated, and it is believed that each weight percentage can vary by plus or minus about 25%, plus or minus about 208, plus or minus about 158, plus or minus about 10%, plus or minus about 5%, plus or minus about 1%, or less than about 18, including all values and subranges therebetween for each of the above ranges. Similarly each of the seventh through tenth embodiments, the overall approximate weight percentages of the components of the coated seeds 10 can be calculated, and it is believed that each weight percentage can vary by plus or minus about 25%, plus or minus about 20%, plus or minus about 15%, plus or minus about 10%, plus or minus about 5%, plus or minus about 18, or less than about 18, including all values and subranges therebetween for each of the above ranges.

Other embodiments and other versions of the above-described embodiments can have one or more layers of lime and/or other non-nutritive and/or nutritive material(s) interposed between at least some of (e.g., between each of) the other coating layers, and the percentage weights can vary. For example, in other versions of the seventh, eighth, ninth, and tenth embodiments, layers of lime are interposed between some of or all of the other coating layers, and/or the outermost (e.g., exterior) coating layer can comprise lime. Other variations are within the scope of this disclosure.

At least partially reiterating from above, the lime can be more generally referred to as a non-nutritive and/or nutritive material, and it is within the scope of this disclosure for the composite coatings 14 to include non-nutritive and/or nutritive materials in addition to and/or other than lime. The composite coatings 14 can include non-nutritive and/or nutritive materials such as talc, lime, and/or any other suitable non-nutritive and/or nutritive materials. Accordingly, for each of the embodiments of this disclosure that are described as including lime, it is believed that the lime may be supplemented with, or replaced with, any other suitable non-nutritive and/or nutritive material(s).

As an example, it is believed that the seed 12 can be substantially uniformly coated with one or more of the aforementioned coating layers using conventional methods of mixing, spraying, or a combination thereof. Various coating machines are available which may utilize various coating technology through the use of rotary coaters, drum coaters, spray coaters, fluidized bed techniques, or a combination thereof.

Figure 3:
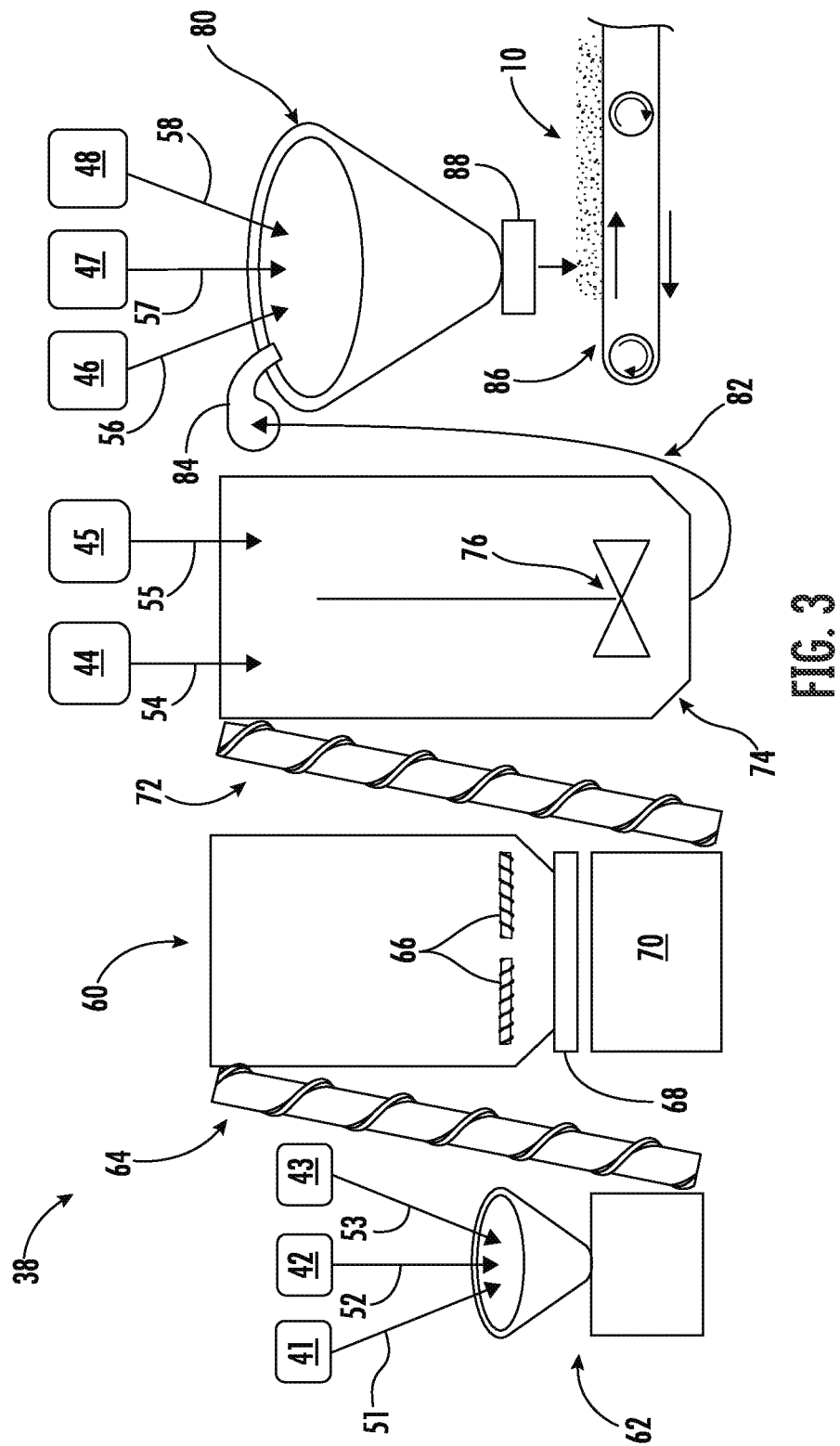
FIG. 3 schematically depicts a system for manufacturing coated seed products, in accordance with at least some of the embodiments of this disclosure.

The seed 12 of the first through tenth embodiments may be coated by way of a batch or continuous coating process. As an example, FIG. 3 schematically depicts a system 38 configured to provide coated seeds 12 in a batch coating process, in accordance with one or more embodiments of this disclosure, for example in accordance with the seventh through tenth embodiments of this disclosure. In FIG. 3, the system 38 includes sources 41 through 48 (e.g., containers, tanks, supply bins, hoppers, basins, and/or any other suitable sources) of constituents that are introduced into the manufacturing process for providing the coated seed products 10. The constituents can be conventional materials or articles that are commercially available.

The system 38 further includes supply pathways 51 through 58 configured to provide the constituents into the manufacturing process from the respective sources 41-48. For each of the supply pathways 51-58 and other pathways described herein, the pathway can include one or more suitable conventional components for facilitating the proper provision of the respective articles or materials. For example, the pathways described herein can include one or more conduits, metering devices, weighing devices, conveying devices (e.g., screw and/or auger conveyors), pumps, and/or other suitable devices, such as devices conventionally used in seed coating processes. As another example, where appropriate, moving constituents along one or more of the pathways described herein can comprise dumping the constituents so that they fall into a predetermined location.

The upstream source 41-43 can be sources of materials that are combined in the system 38 to form a dry fertilizer composition. Predetermined amounts of the material(s) from one or more of the upstream sources 41-43 can be supplied into the dry storage unit 60 respectively by way of the upstream supply pathways 51-52, and optionally also by way of an initial collection container or collection unit 62, and an upstream process pathway 64. The upstream source 41 can be a source of fertilizer (e.g., "fertilizer source 41"), and there can be one or more of the fertilizer sources. The upstream sources 42, 43 can be sources of one or more additives (e.g., "additive sources 42, 43"). There can be one or more of the additive sources 42, 43; or one or more of the additive sources and associated upstream supply pathways 52, 53 can be omitted.

The dry storage unit 60 that can be a holding container, holding bin, or other suitable apparatus. As schematically depicted in FIG. 3, the upstream process pathway 64 can comprise a screw and/or auger conveyor, although any other suitable transporting devices can be used. Predetermined amounts of the material(s) from one or more of the upstream sources 41-43 can be supplied into the dry storage unit 60 in any suitable manner.

The dry storage unit 60 can include one or more mixing devices 66 within its interior for mixing the fertilizer or fertilizer composition contained therein. As schematically depicted in FIG. 3, the mixing devices 66 can be screw agitators that are rotated by a motor (not shown), although the mixing devices can be any other suitable types of mixers and/or agitators. The dry storage unit 60 may also be referred to as a mixing unit.

A lower opening of the dry storage unit 60 can be opened and closed by a discharge valve assembly 68 and/or another suitable device. The discharge valve assembly 68 can be configured to supply the mixed fertilizer or fertilizer composition from the dry storage unit 60 to a weight scale 70, so that a predetermined amount can be supplied by way of the weight scale and an intermediate process pathway 72 to a wet storage unit 74. As schematically depicted in FIG. 3, the upstream and intermediate pathways 64, 72 can comprise screw and/or auger conveyors, although any other suitable transporting devices can be used. The predetermined amount of the fertilizer or fertilizer composition can be provided to the wet storage unit 74 in any suitable manner.

The wet storage unit 74 can be a holding container, holding bin, or other suitable apparatus. The intermediate sources 44, 45 can be sources of materials that are combined with the fertilizer or fertilizer composition in the wet storage unit 74 to form a wet coating composition. Predetermined amounts of the material(s) from one or more of the intermediate sources 44, 45 can be supplied into the wet storage unit 74 respectively by way of the intermediate supply pathways 51, 52. The source 44 can be a source of a binding agent, for example a source of the polymeric binder or sticker (e.g., "sticker source 44"). The source 45 can be a source of solvent, for example a source of water (e.g., "water source 45"). The wet storage unit 74 can include one or more mixing devices 76 within its interior for mixing the contents of the wet storage unit. As schematically depicted in FIG. 3, the mixing device 76 can be an impeller that is rotated by a motor (not shown), although the mixing device can include any other suitable types of mixers and/or agitators. Accordingly, the wet storage unit 74 may also be referred to as a mixing unit.

A predetermined amount of the wet coating composition can be supplied from the wet storage unit 74 into a batch coater 80 by way of downstream process pathway 82. The supplied wet coating composition may be in the form of, or at least partially in the form of, a solution. The downstream process pathway 82 can comprise one or more pumps, for example a metering pump 84, for forcing the coating composition along a conduit (e.g., piping) into the batch coater 80. The batch coater 80 can be a rotary batch coater, wherein an outer barrel and/or internal component(s) (not shown) are rotated by a motor (not shown).

The downstream sources 46-48 can be sources of articles and materials that are supplied to the batch coater 80. Predetermined amounts of the article(s)/material(s) from one or more of the downstream sources 46-48 can be supplied into the batch coater 80 respectively by way of the downstream supply pathways 56-58. The source 46 can be a source of the seed 12 (e.g., "seed source 46"), and the seed can be grass seed or any other suitable types of seeds. The downstream sources 47, 48 can be sources of one or more coating materials (e.g., "coating sources 47, 48"). There can be one or more of the coating sources 47, 48; or one or more of the coating sources and associated downstream supply pathways 57, 58 can be omitted. As a more specific example, one or more of the coating sources 47, 48 can be a source of non-nutritive and/or nutritive material (e.g., lime and/or other suitable material(s)).

As an example, for producing a batch of the coated seed product 10, a predetermined amount of grass seed 12 can be deposited into the batch coater 80. Then, while the batch coater 80 is operating (e.g., rotating and/or otherwise agitating its contents), predetermined amounts of the wet coating composition from the wet storage unit 74, and optionally predetermined amounts of one or more coating materials from the coating sources 47, 48, can be serially deposited into the batch coater to create the coated seed product 10. Typically, there is a predetermined time delay between respective occurrences of the depositing of the articles and materials into the batch coater 80, for example so that the coating layers 21-30 are serially formed.

Then, after the coated seed product 10 is formed (e.g., at least partially formed) in the batch coater 80, the coated seed product can be dumped or otherwise provided from the batch coater to a traveling belt of a conveyor apparatus 86 configured to facilitate at least further drying of the coated seed product, or the like. For example, a lower opening of the batch coater 80 can be opened and closed by a discharge valve assembly 88 and/or another suitable device, and the coated seed product 10 may reach the conveyer 86 by way of the valve assembly 88. The conveyor 86 can transport the coated seed product 10 to a next step or stage in the process, for example to a conventional packaging unit where the coated seed product is placed in bags that are closed, so that the bags can be transported and the coated seed product can thereafter be used accordingly. The conveyer 86 and/or valve assembly 88 can be omitted or replaced with any other suitable devices. For example, the batch coater 80 can be a drum-type coater, wherein the drum is mounted for being pivoted to dump out the coated seed product 10, or the like.

In accordance with an eleventh embodiment, a method of coating grass seed 12 using the system 38 comprises, consists of, or consists essentially of:

Step 1 of Example 2: provide the fertilizer (e.g., urea-based and/or calcium nitrate nutrients) into the collection unit 62.

Step 2 of Example 2: move the fertilizer to the dry storage unit 60 and operate the moving or mixing device(s) 66 to keep the fertilizer moving within the dry storage unit.

Step 3 of Example 2: provide a predetermined amount of the mixed fertilizer from the dry storage unit to the weight scale 70, comprising weighing out a predetermined amount.

Step 4 of Example 2: move the predetermined amount of fertilizer to, and also provide a predetermined amount of the binder or sticker solution and/or water to the wet storage unit 74 and operate the mixing device(s) 76 to form the wet coating composition.

Step 5 of Example 2: provide a predetermined amount of the seed 12 to the batch coater 80, while the batch coater is in its coating configuration (e.g., the discharge assembly 88 of the batch coater 80 is closed and remains closed through Step 15 of Example 2, or the like).

Step 6 of Example 2: at least partially forming coating layer 21, comprising providing a predetermined amount of (e.g., one fifth of) the wet coating composition to the batch coater 80 and operating the batch coater accordingly.

Step 7 of Example 2: at least partially forming coating layer 22, comprising providing a predetermined amount of (e.g., one fifth of) the lime to the batch coater 80 and operating the batch coater accordingly.

Step 8 of Example 2: at least partially forming coating layer 23, comprising providing a predetermined amount of (e.g., one fifth of) the wet coating composition to the batch coater 80 and operating the batch coater accordingly.

Step 9 of Example 2: at least partially forming coating layer 24, comprising providing a predetermined amount of (e.g., one fifth of) the lime to the batch coater 80 and operating the batch coater accordingly.

Step 10 of Example 2: at least partially forming coating layer 25, comprising providing a predetermined amount of (e.g., one fifth of) the wet coating composition to the batch coater 80 and operating the batch coater accordingly.

Step 11 of Example 2: at least partially forming coating layer 26, comprising providing a predetermined amount of (e.g., one fifth of) the lime to the batch coater 80 and operating the batch coater accordingly.

Step 12 of Example 2: at least partially forming coating layer 27, comprising providing a predetermined amount of (e.g., one fifth of) the wet coating composition to the batch coater 80 and operating the batch coater accordingly.

Step 13 of Example 2: at least partially forming coating layer 28, comprising providing a predetermined amount of (e.g., one fifth of) the lime to the batch coater 80 and operating the batch coater accordingly.

Step 14 of Example 2: at least partially forming coating layer 29, comprising providing a predetermined amount of (e.g., one fifth of) the wet coating composition to the batch coater 80 and operating the batch coater accordingly.

Step 15 of Example 2: at least partially forming coating layer 30, comprising providing a predetermined amount of (e.g., one fifth of) the lime to the batch coater 80 and operating the batch coater accordingly.

Step 16 of Example 2: providing the resultant coated seed product from the batch coater 80 to the conveyor apparatus 86 to facilitate at least further drying of the coated seed product, or the like.

In some embodiments of this disclosure, a polymeric binder or sticker solution (e.g., from the "sticker source 44") is not deposited into the wet storage unit 74. For example, the polymeric binder or sticker solution may be omitted from the composite coating 14. As another example, as an alternative to, or in addition to, providing the polymeric binder or sticker solution into the wet storage unit 74, the polymeric binder or sticker solution may be provided from one or more of the coating sources 47, 48 into the batch coater 80.

As an alternative to including the polymeric binder or sticker solution, or in addition to including the polymeric binder or sticker solution, lime or some other suitable material of the composite coating 14 may function as a binding agent. For example, after the wet coating composition is supplied from the wet storage unit 74 into the batch coater 80 so that the seeds 12 in the batch coater are coated with the wet coating composition, then dry lime powder can be introduced into the batch coater, so that the lime is wetted by, and becomes bonded to, the wet coating composition on the seeds. The wet coating composition can include water, and it is believed that binding by the lime may be enhanced by dissolving the urea fertilizer in the water of the wet coating composition. In some embodiments, the binding effect provided by the lime may be sufficient such that the polymeric binder or sticker solution can be reduced or completely omitted from the composite coating 14. The lime may be supplemented with, or replaced by, other suitable non-nutritive and/or nutritive material(s).

For example, and reiterating from above, all numerical values and percentages provided throughout this disclosure can be approximate, and for each range specified in this disclosure, all values within the range and all subranges within the range are also disclosed.

It is believed that further examples of fertilizers that can be used in various combinations and subcombinations in the composite coatings 14 of this disclosure include ferrous ammonium sulfate, HYDREXX® urea fertilizer stabilizer, UMAXX® fertilizer and any other suitable fertilizers. Further examples of grass seed that can be incorporated into the agricultural products of this disclosure include Kentucky bluegrass, strong creeping fescue, chewing fescue, hard fescue, perennial ryegrass, tall fescue, Bermuda grass and/or any other suitable seeds that can be coated with the composite coatings 14 of this disclosure.

In the foregoing, examples of embodiments have been disclosed. The present invention is not limited to such exemplary embodiments. In the foregoing, descriptions of sequences of steps or other actions are described for purposes of providing examples, and not for the purpose of limiting the scope of this disclosure (e.g., where appropriate: steps or actions may be performed in different sequences than described above, and steps and actions may be omitted and/or added). Unless otherwise noted, specific terms have been used in a generic and descriptive sense and not for purposes of limitation. The use of the term "and/or" includes any and all combinations of one or more of the associated listed items.

The invention claimed is:

1. An agricultural product, comprising:
a seed; and
a composite coating at least partially enclosing the seed, the composite coating comprising a plurality of coating layers, and the plurality of coating layers comprising:
a first coating layer extending at least partially around the seed,
a second coating layer extending at least partially around the first coating layer,
a third coating layer extending at least partially around the second coating layer,
a fourth coating layer extending at least partially around the third coating layer, and
a fifth coating layer extending at least partially around the fourth coating layer,
wherein at least two coating layers of the plurality of coating layers:
each extend completely around the seed,
are not contiguous with one another,
are spaced apart from one another, and
each comprise fertilizer, the fertilizer comprising urea and calcium nitrate,
wherein at least two other coating layers of the plurality of coating layers are coating layers of a non-nutritive material and/or a nutritive material that:
each extend completely around the seed,
are not contiguous with one another,
are spaced apart from one another,
wherein at least one of the two coating layers of the non-nutritive material and/or the nutritive material is positioned between the two coating layers comprising fertilizer, and
wherein each of the two coating layers comprising fertilizer is more nutritive than each of the two coating layers of the non-nutritive material and/or the nutritive material.

2. The agricultural product of claim 1, wherein the at least two other coating layers of the plurality of coating layers are coating layers of the non-nutritive material, wherein the non-nutritive material is lime, and wherein each of the two coating layers comprising fertilizer is more nutritive than each of the two coating layers of the non-nutritive material.

3. The agricultural product of claim 1, wherein the at least two other coating layers of the plurality of coating layers are coating layers of the nutritive material.

4. The agricultural product of claim 3, wherein the nutritive material comprises a secondary nutrient.

5. The agricultural product of claim 4, wherein the secondary nutrient comprises calcium, magnesium, and/or sulfur.

6. The agricultural product of claim 3, wherein the nutritive material comprises gypsum.

7. The agricultural product of claim 3, wherein the nutritive material comprises a micronutrient.

8. The agricultural product of claim 7, wherein the micronutrient comprises iron, manganese, zinc, copper, molybdenum, boron, and/or chlorine.

9. The agricultural product of claim 1, wherein the plurality of coating layers comprises an outer coating layer, the outer coating layer comprising fertilizer and a polymeric binder, the fertilizer comprising urea and calcium nitrate.

10. The agricultural product of claim 1, wherein the plurality of coating layers comprises an outer coating layer, the outer coating layer comprising a polymeric binder.

11. The agricultural product of claim 1, wherein:
the first coating layer is a coating layer of a urea fertilizer and calcium nitrate fertilizer composition;
the second coating layer is a coating layer of gypsum;
the third coating layer is a coating layer of a urea fertilizer and calcium nitrate fertilizer composition;
the fourth coating layer is a coating layer of gypsum; and
the fifth coating layer is a coating layer of a urea fertilizer and calcium nitrate fertilizer composition.

12. The agricultural product of claim 11, wherein:
the first coating layer comprises polymeric binder;
the third coating layer comprises polymeric binder; and
the fifth coating layer comprises polymeric binder.

13. The agricultural product of claim 11, further comprising:
a sixth coating layer extending at least partially around the fifth coating layer,
a seventh coating layer extending at least partially around the sixth coating layer, and
an eighth coating layer extending at least partially around the seventh coating layer.

14. The agricultural product of claim 13, wherein the seventh coating layer comprises fertilizer, the fertilizer comprising urea and calcium nitrate, and the sixth and eighth coating layers comprise gypsum.

15. The agricultural product of claim 1, wherein:
the first coating layer is a coating layer of a urea fertilizer and calcium nitrate fertilizer composition;
the second coating layer is a coating layer of lime;
the third coating layer is a coating layer of a urea fertilizer and calcium nitrate fertilizer composition;
the fourth coating layer is a coating layer of lime; and
the fifth coating layer is a coating layer of a urea fertilizer and calcium nitrate fertilizer composition.

16. The agricultural product of claim 15, wherein:
the first coating layer comprises polymeric binder;
the third coating layer comprises polymeric binder; and
the fifth coating layer comprises polymeric binder.

17. The agricultural product of claim 15, further comprising:
a sixth coating layer extending at least partially around the fifth coating layer,
a seventh coating layer extending at least partially around the sixth coating layer, and
an eighth coating layer extending at least partially around the seventh coating layer.

18. The agricultural product of claim 17, wherein the seventh coating layer comprises fertilizer, the fertilizer comprising urea and calcium nitrate, and the sixth and eighth coating layers comprise lime.

19. The agricultural product of claim 1, wherein the at least two coating layers comprising fertilizer are prepared from a fertilizer composition comprising urea and calcium nitrate in a weight ratio of about 25:75 urea:calcium nitrate.

20. The agricultural product of claim 1, wherein the composite coating comprises a weight ratio of calcium nitrate:urea of about 80:20 to about 90:10.

21. The agricultural product of claim 1, wherein the composite coating comprises a weight ratio of calcium nitrate:urea of about 80:20 to about 85:15.

22. An agricultural product, comprising:
a seed; and
a composite coating at least partially enclosing the seed, the composite coating comprising a plurality of coating layers, and the plurality of coating layers comprising:
a first coating layer extending at least partially around the seed,
a second coating layer extending at least partially around the first coating layer,
a third coating layer extending at least partially around the second coating layer,
a fourth coating layer extending at least partially around the third coating layer, and
a fifth coating layer extending at least partially around the fourth coating layer,
wherein at least two coating layers of the plurality of coating layers:
each extend completely around the seed,
are not contiguous with one another,
are spaced apart from one another, and
each comprise fertilizer, the fertilizer comprising urea and calcium nitrate,
wherein at least two other coating layers of the plurality of coating layers are coating layers of gypsum that:
each extend completely around the seed,
are not contiguous with one another, and
are spaced apart from one another,
wherein at least one of the coating layers of gypsum is positioned between the two coating layers comprising fertilizer.

23. The agricultural product of claim 22, wherein the plurality of coating layers comprises an outer coating layer, the outer coating layer comprising fertilizer and a polymeric binder, the fertilizer comprising urea and calcium nitrate.

24. The agricultural product of claim 22, wherein the plurality of coating layers comprises an outer coating layer, the outer coating layer comprising a polymeric binder.

25. The agricultural product of claim 22, wherein:
the first coating layer is a coating layer of a urea fertilizer and calcium nitrate fertilizer composition;
the second coating layer is a coating layer of gypsum;
the third coating layer is a coating layer of a urea fertilizer and calcium nitrate fertilizer composition;
the fourth coating layer is a coating layer of gypsum; and
the fifth coating layer is a coating layer of a urea fertilizer and calcium nitrate fertilizer composition.

26. The agricultural product of claim 25, wherein:
the first coating layer comprises polymeric binder;
the third coating layer comprises polymeric binder; and
the fifth coating layer comprises polymeric binder.

27. The agricultural product of claim 25, further comprising:
a sixth coating layer extending at least partially around the fifth coating layer,
a seventh coating layer extending at least partially around the sixth coating layer, and
an eighth coating layer extending at least partially around the seventh coating layer.

28. The agricultural product of claim 27, wherein the seventh coating layer comprises fertilizer, the fertilizer comprising urea and calcium nitrate, and the sixth and eighth coating layers comprise gypsum.

29. An agricultural product, comprising:
a grass seed; and
a composite coating at least partially enclosing the grass seed, the composite coating comprising a plurality of coating layers, and the plurality of coating layers comprising:
a first coating layer extending at least partially around the grass seed,
a second coating layer extending at least partially around the first coating layer,
a third coating layer extending at least partially around the second coating layer,
a fourth coating layer extending at least partially around the third coating layer, and
a fifth coating layer extending at least partially around the fourth coating layer,
wherein at least two coating layers of the plurality of coating layers:
each extend completely around the grass seed,
are not contiguous with one another,
are spaced apart from one another, and
each comprise fertilizer,
wherein at least two other coating layers of the plurality of coating layers are coating layers of a non-nutritive material and/or a nutritive material that:
each extend completely around the grass seed,
are not contiguous with one another, and
are spaced apart from one another,
wherein at least one of the two coating layers of the non-nutritive material and/or the nutritive material is positioned between the two coating layers comprising fertilizer, and
wherein each of the two coating layers comprising fertilizer is more nutritive than each of the two coating layers of the non-nutritive material and/or the nutritive material.

30. The agricultural product of claim 29, wherein the at least two other coating layers of the plurality of coating layers are coating layers of the non-nutritive material and wherein each of the two coating layers comprising fertilizer is more nutritive than each of the two coating layers of the non-nutritive material.

31. The agricultural product of claim 29, wherein the at least two other coating layers of the plurality of coating layers are coating layers of the non-nutritive material, wherein the non-nutritive material is lime, and wherein each of the two coating layers comprising fertilizer is more nutritive than each of the two coating layers of the non-nutritive material.

32. The agricultural product of claim 29, wherein the at least two other coating layers of the plurality of coating layers are coating layers of the nutritive material.

33. The agricultural product of claim 32, wherein the nutritive material comprises a secondary nutrient.

34. The agricultural product of claim 33, wherein the secondary nutrient comprises calcium, magnesium, and/or sulfur.

35. The agricultural product of claim 32, wherein the nutritive material comprises gypsum.

36. The agricultural product of claim 32, wherein the nutritive material comprises a micronutrient.

37. The agricultural product of claim 36 wherein the micronutrient comprises iron, manganese, zinc, copper, molybdenum, boron, and/or chlorine.

38. The agricultural product of claim 29, further comprising:
- a sixth coating layer extending at least partially around the fifth coating layer,
- a seventh coating layer extending at least partially around the sixth coating layer, and
- an eighth coating layer extending at least partially around the seventh coating layer.

39. The agricultural product of claim 29, wherein at least two coating layers of the plurality of coating layers comprise a binder.

40. The agricultural product of claim 39, wherein the binder comprises at least one material selected from a group consisting of lime and polymeric material.

41. The agricultural product of claim 29, wherein:
- the first coating layer is a coating layer of fertilizer composition;
- the second coating layer is a coating layer of non-nutritive material and/or a nutritive material;
- the third coating layer is a coating layer of fertilizer composition;
- the fourth coating layer is a coating layer of non-nutritive material and/or a nutritive material; and
- the fifth coating layer is a coating layer of fertilizer composition.

42. The agricultural product of claim 41, wherein:
- the first coating layer is a coating layer of fertilizer composition;
- the second coating layer is a coating layer of non-nutritive material;
- the third coating layer is a coating layer of fertilizer composition;
- the fourth coating layer is a coating layer of non-nutritive material; and
- the fifth coating layer is a coating layer of fertilizer composition.

43. The agricultural product of claim 41, wherein:
- the first coating layer is a coating layer of fertilizer composition;
- the second coating layer is a coating layer of a nutritive material;
- the third coating layer is a coating layer of fertilizer composition;
- the fourth coating layer is a coating layer of a nutritive material; and
- the fifth coating layer is a coating layer of fertilizer composition.

44. The agricultural product of claim 41, wherein:
- the first coating layer comprises polymeric material;
- the third coating layer comprises polymeric material; and
- the fifth coating layer comprises polymeric material.

45. The agricultural product of claim 41, further comprising:
- a sixth coating layer extending at least partially around the fifth coating layer, wherein the sixth coating layer is a coating layer of non-nutritive material and/or nutritive material;
- a seventh coating layer extending at least partially around the sixth coating layer and comprising fertilizer;
- an eighth coating layer extending at least partially around the seventh coating layer, wherein the eighth coating layer is a coating layer of non-nutritive material and/or nutritive material;
- a ninth coating layer extending at least partially around the eighth coating layer and comprising fertilizer; and
- a tenth coating layer extending at least partially around the ninth coating layer, wherein the tenth coating layer is a coating layer of non-nutritive material and/or nutritive material.

\* \* \* \* \*